US008203754B2

(12) United States Patent
Yoshida

(10) Patent No.: US 8,203,754 B2
(45) Date of Patent: Jun. 19, 2012

(54) COLOR CONVERSION DEVICE, PROGRAM, AND METHOD

(75) Inventor: Yasunari Yoshida, Aichi-ken (JP)

(73) Assignee: Brother Kogyo Kabushiki Kaisha, Aichi-ken (JP)

(*) Notice: Subject to any disclaimer, the term of this patent is extended or adjusted under 35 U.S.C. 154(b) by 931 days.

(21) Appl. No.: 12/243,454

(22) Filed: Oct. 1, 2008

(65) Prior Publication Data

US 2009/0086228 A1    Apr. 2, 2009

(30) Foreign Application Priority Data

Oct. 1, 2007    (JP) .................................. 2007-258153
Dec. 27, 2007    (JP) .................................. 2007-335775

(51) Int. Cl.
*G06F 1/00*    (2006.01)
*H04N 1/40*    (2006.01)
*G03F 3/06*    (2006.01)

(52) U.S. Cl. .......... 358/1.9; 358/1.2; 358/520; 358/3.01

(58) Field of Classification Search .................... 358/1.9, 358/1.2, 520, 3.01, 3.02
See application file for complete search history.

(56) References Cited

U.S. PATENT DOCUMENTS

| | | | |
|---|---|---|---|
| 5,162,860 A | 11/1992 | Nami et al. | |
| 5,285,246 A | 2/1994 | Danzuka et al. | |
| 6,102,533 A | 8/2000 | Nozawa et al. | |
| 6,152,555 A | 11/2000 | Nozawa et al. | |
| 7,320,510 B2 * | 1/2008 | Nakamura et al. | 347/15 |
| 7,407,248 B2 | 8/2008 | Hirano et al. | |
| 7,436,543 B2 | 10/2008 | Yamamoto et al. | |
| 7,599,096 B2 | 10/2009 | Yoshida | |
| 7,643,173 B2 | 1/2010 | Komatsu | |
| 2007/0064031 A1 | 3/2007 | Nakano et al. | |

FOREIGN PATENT DOCUMENTS

| | | |
|---|---|---|
| JP | S63-180270 | 7/1988 |
| JP | H04-207463 | 7/1992 |
| JP | H08-137095 | 5/1996 |
| JP | 10-119257 | 5/1998 |
| JP | 11-127359 | 5/1999 |

(Continued)

OTHER PUBLICATIONS

Official Action dated Jul. 5, 2011 received from the Japanese Patent Office from related Japanese Application No. 2007-335775, together with an English-language translation.

(Continued)

*Primary Examiner* — Houshang Safaipour
(74) *Attorney, Agent, or Firm* — Scully, Scott, Murphy & Presser, PC

(57) ABSTRACT

A color conversion device converts an input value to an output value in order to form an image on a recording medium using an achromatic ink and a chromatic ink. The color conversion device include a first color converting unit, a second color converting unit, an adjustment value setting unit, and an output value acquiring unit. The first color converting unit converts the input value to first color data including a first chromatic component value. The second color converting unit converts the input value to second color data including a second chromatic component value and a first achromatic component value. The adjustment value setting unit sets an adjustment value based on a type of the recording medium. The output value acquiring unit acquires the output value by weighting the first color data and the second color data according to the adjustment value.

19 Claims, 16 Drawing Sheets

FOREIGN PATENT DOCUMENTS

| | | |
|---|---|---|
| JP | 2000-188683 | 7/2000 |
| JP | 2001-119591 | 4/2001 |
| JP | 2002-325182 | 11/2002 |
| JP | 2004-142423 | 5/2004 |
| JP | 2004-284156 | 10/2004 |
| JP | 2004-338098 | 12/2004 |
| JP | 2004-349980 | 12/2004 |
| JP | 2006-068982 | 3/2006 |
| JP | 2006-140655 | 6/2006 |
| JP | 2006-238025 | 9/2006 |
| JP | 2007-43250 | 2/2007 |
| JP | 2007-118238 | 5/2007 |
| JP | 2007-136845 | 6/2007 |
| JP | 2007-137049 | 6/2007 |
| JP | 2007-158688 | 6/2007 |

OTHER PUBLICATIONS

Official Action dated May 31, 2011 received from the Japanese Patent Office from related Japanese Application No. 2007-258153, together with an English-language translation.

* cited by examiner

EXAMPLE OF GCR TABLE 143

EXAMPLE OF PAPER TYPE TABLE 144

| PAPER TYPE | ADJUSTMENT PARAMETER $a_1$ |
|---|---|
| SPECIAL PAPER | 0.0 |
| PAPER 1 | 1.0 |
| PAPER 2 | 0.5 |
| PAPER 3 | 0.3 |
| OTHER | 0.0 |

(PC PROCESS)

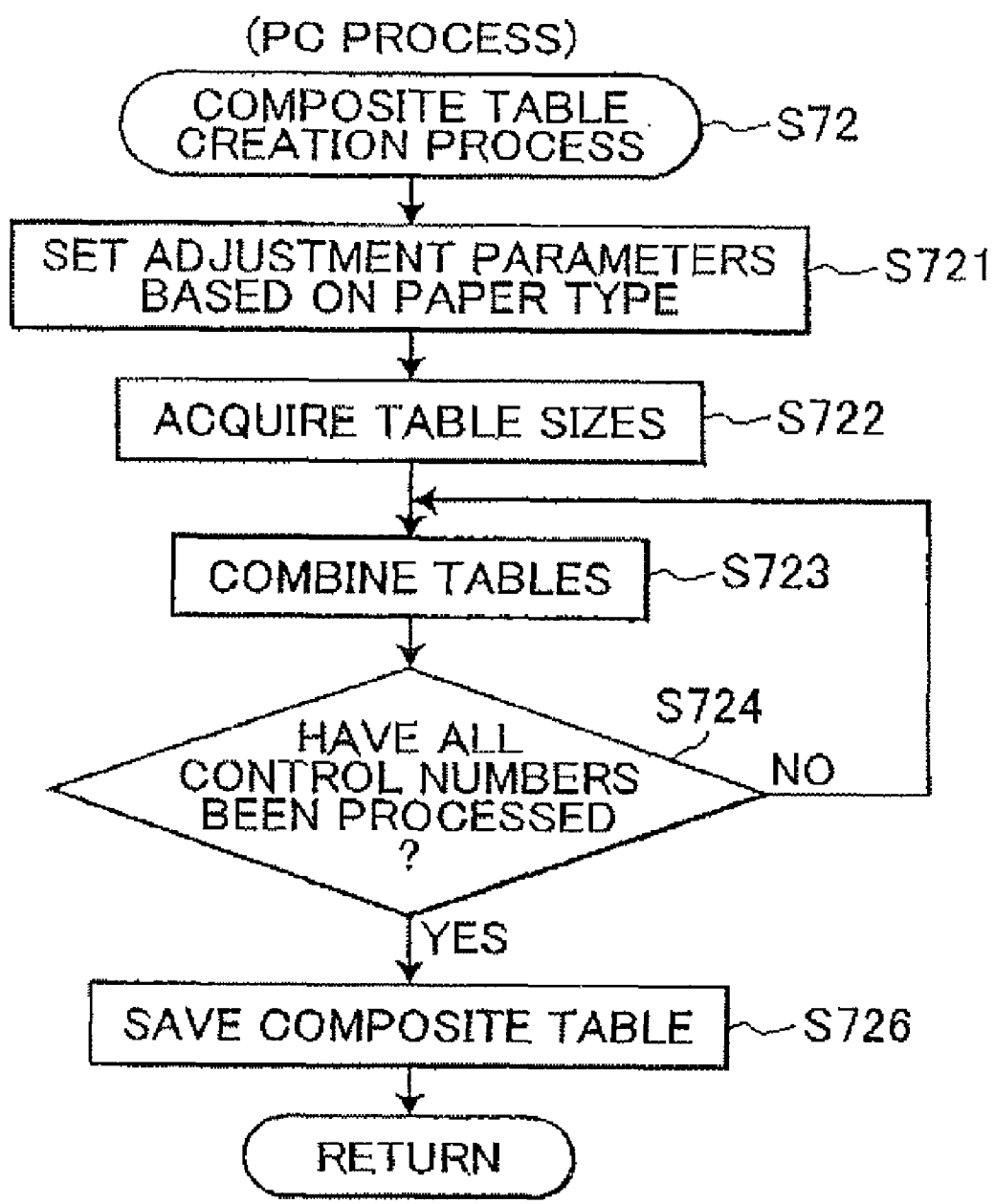

HDD 14 OF PC 10 ACCORDING TO FOURTH EMBODIMENT

EXAMPLE OF GCR TABLE 151

EXAMPLE OF PAPER TYPE TABLE 152

| PAPER TYPE | ADJUSTMENT PARAMETER $a_2$ | TOTAL INK QUANTITY b |
|---|---|---|
| SPECIAL PAPER | 1 | 320 |
| PAPER 1 | 0 | 304 |
| PAPER 2 | 0.5 | 266 |
| PAPER 3 | 0.7 | 290 |
| OTHER | 1 | 300 |

COLOR CONVERSION DEVICE, PROGRAM, AND METHOD

CROSS REFERENCE TO RELATED APPLICATION

The present application claims priority from Japanese patent applications No. 2007-258153 filed Oct. 1, 2007 and No. 2007-335775 filed Dec. 21, 2007. The entire contents of the priority applications are incorporated herein by reference.

TECHNICAL FIELD

The present invention relates to a color conversion apparatus, a storage medium storing a color conversion program, and a color conversion method.

BACKGROUND

Image-forming devices capable of forming images by ejecting ink onto recording paper are well known in the art. The ink used in these image-forming devices is broadly divided among pigment inks and dye-based inks. However, pigment ink has a lower fixing property to paper than dye-based ink, which can lead to problems. For example, when printing on the back surface of the recording paper in duplex printing, pigment ink can become deposited on paper-conveying rollers that contact the printed top surface of the paper.

Pigment ink is often used for black ink (hereinafter referred to as "K ink"). Hence, due to the problem described above, it is important to adjust the density (usage quantity) of K ink to a value appropriate for the type of recording paper.

Specifically, the fixing property of ink can fluctuate due to differences in the type of recording paper, i.e., whether the paper is normal, special paper, or glossy, for example. Even among the same type of recording paper, the fixing property can vary, as in the case of normal paper produced by different manufacturers and according to different manufacturing methods. While it is possible to resolve the fixing problem for all types of recording paper by creating a color table with low quantity settings for K ink based on the recording paper with the lowest fixing property and using this color table for all types of recording paper, this method may lead to a separate problem of not being able to produce sufficient image quality (accurate color tones).

Another conceivable method involves creating a color table storing optimum black component values for each type of recording paper. However, since this method requires that tables be created and stored for all possible types of recording paper that can be used on the image-forming device, the number of steps for creating the color tables and the amount of memory usage would be enormous and, therefore, not practical.

In light of this problem, Japanese Patent Application Publication No. 2007-118238 discloses a technology for setting a lower color density (i.e., reducing the ink quantity) when performing duplex printing than when performing single-sided printing. As a result, ejected ink is absorbed by the recording paper, preventing ink on a printed surface of the recording paper from transferring onto paper-conveying rollers and the like when performing duplex printing.

SUMMARY

However, Japanese Patent Application Publication No. 2007-118238 deals only with the problem related to duplex printing and offers no improvements for overcoming other problems that might arise when printing on recording paper having a low ink-fixing property. For example, when using recording paper having a low ink-fixing property, the ink may soil the user's fingers or the like if the user rubs the printed matter before the ink is dry, even in the case of single-sided printing.

In view of the foregoing, it is an object of the present invention to provide a color conversion device, a storage medium storing a color conversion program, and a color conversion method capable of minimizing the amount of memory usage and capable of setting achromatic component values in the output values suited to the type of recording medium.

To achieve the above and other objects, one aspect of the invention provides a color conversion device for converting an input value to an output value in order to form an image on a recording medium using an achromatic ink and a chromatic ink. The color conversion device include a first color converting unit, a second color converting unit, an adjustment value setting unit, and an output value acquiring unit. The first color converting unit converts the input value to first color data including a first chromatic component value. The second color converting unit converts the input value to second color data including a second chromatic component value and a first achromatic component value. The adjustment value setting unit sets an adjustment value based on a type of the recording medium. The output value acquiring unit acquires the output value by weighting the first color data and the second color data according to the adjustment value.

In another aspect of the present invention, there is provided a color conversion device for converting an input value to an output value in order to form an image on a recording medium using an achromatic ink and a chromatic ink. The color conversion device includes a first relationship storing unit, a second relationship storing unit, an adjustment value setting unit, a relationship creating unit, and an output value acquiring unit. The first relationship storing unit stores a first relationship between the input value and a combination of a first achromatic component value and a first chromatic component value. The second relationship storing unit stores a second relationship between the input value and a combination of a second achromatic component value and a second chromatic component value such that the second achromatic component value is equal to or greater than the first achromatic component value. The adjustment value setting unit sets an adjustment value based on a type of the recording medium. The relationship creating unit creates a third relationship between the input value and a combination of a third achromatic component value and a third chromatic component value by weighting the first achromatic and chromatic component values and the second achromatic and chromatic component values based on the adjustment value. The output value acquiring unit that acquires the output value, according to the third chromatic component value and the third achromatic component value, by converting the input value based on the third relationship.

In another aspect of the present invention, there is provided a color conversion device for converting an input value to an output value in order to form an image on a recording medium using an achromatic ink and a chromatic ink. The color conversion device includes a determining unit, a limiting value setting unit, a limiting unit, and an output value setting unit. The determining unit determines a first chromatic component value and a first achromatic component value from the input value based on a predetermined relationship. The predetermined relationship defines that the first chromatic component value increases as a gray component of the input value increases. The limiting value setting unit sets a limiting value based on a type of the recording medium. The limiting unit limits the first achromatic component value by the limiting value. The output value setting unit sets the output value based the first chromatic component value and a limited first achromatic component value.

In another aspect of the present invention, there is provided a computer-readable storage medium storing a computer-executable color conversion program for a color conversion device. The color conversion device converts an input value to an output value in order to form an image on a recording medium using an achromatic ink and a chromatic ink. The color conversion program includes:

instructions for converting the input value to first color data including a first chromatic component value;

instructions for converting the input value to second color data including a second chromatic component value and a first achromatic component value;

instructions for setting an adjustment value based on a type of the recording medium; and instructions for acquiring the output value by weighting the first color data and the second color data according to the adjustment value.

In another aspect of the present invention, there is provided a computer-readable storage medium storing a computer-executable color conversion program for a color conversion device. The color conversion device converts an input value to an output value in order to form an image on a recording medium using an achromatic ink and a chromatic ink. The color conversion device includes a first relationship storing unit that stores a first relationship between the input value and a combination of a first achromatic component value and a first chromatic component value; and a second relationship storing unit that stores a second relationship between the input value and a combination of a second achromatic component value and a second chromatic component value such that the second achromatic component value is equal to or greater than the first achromatic component value. The color conversion program includes:

instructions for setting an adjustment value based on a type of the recording medium;

instructions for creating a third relationship between the input value and a combination of a third achromatic component value and a third chromatic component value by weighting the first achromatic and chromatic component values and the second achromatic and chromatic component values based on the adjustment value; and instructions for acquiring the output value, according to the third chromatic component value and the third achromatic component value, by converting the input value based on the third relationship.

In another aspect of the present invention, there is provided a computer-readable storage medium storing a computer-executable color conversion program for a color conversion device. The color conversion device converts an input value to an output value in order to form an image on a recording medium using an achromatic ink and a chromatic ink. The color conversion program includes:

instructions for determining a chromatic component value and a achromatic component value from the input value based on a predetermined relationship, the predetermined relationship defining that the chromatic component value increases as a gray component of the input value increases;

instructions for setting a limiting value based on a type of the recording medium;

instructions for limiting the achromatic component value by the limiting value; and instructions for setting the output value based the chromatic component value and a limited achromatic component value.

In another aspect of the present invention, there is provided a color conversion method for converting an input value to an output value in order to form an image on a recording medium using an achromatic ink and a chromatic ink. The color conversion method includes:

converting the input value to first color data including a first chromatic component value;

converting the input value to second color data including a second chromatic component value and a first achromatic component value;

setting an adjustment value based on a type of the recording medium; and acquiring the output value by weighting the first color data and the second color data according to the adjustment value.

In another aspect of the present invention, there is provided a color conversion method for a color conversion device. The color conversion device converts an input value to an output value in order to form an image on a recording medium using an achromatic ink and a chromatic ink. The color conversion device includes a first relationship storing unit that stores a first relationship between the input value and a combination of a first achromatic component value and a first chromatic component value; and a second relationship storing unit that stores a second relationship between the input value and a combination of a second achromatic component value and a second chromatic component value such that the second achromatic component value is equal to or greater than the first achromatic component value. The color conversion program includes:

setting an adjustment value based on a type of the recording medium;

creating a third relationship between the input value and a combination of a third achromatic component value and a third chromatic component value by weighting the first achromatic and chromatic component values and the second achromatic and chromatic component values based on the adjustment value; and acquiring the output value, according to the third chromatic component value and the third achromatic component value, by converting the input value based on the third relationship.

In another aspect of the present invention, there is provided a color conversion method for converting an input value to an output value in order to form an image on a recording medium using an achromatic ink and a chromatic ink. The color conversion program includes:

determining a chromatic component value and a achromatic component value from the input value based on a predetermined relationship, the predetermined relationship defining that the chromatic component value increases as a gray component of the input value increases;

setting a limiting value based on a type of the recording medium;

limiting the achromatic component value by the limiting value; and setting the output value based the chromatic component value and a limited achromatic component value.

BRIEF DESCRIPTION OF THE DRAWINGS

In the drawings:

FIG. 13B is a flowchart illustrating steps in a composite table creation process executed on the personal computer according to the third embodiment;

DETAILED DESCRIPTION

Figure 1:
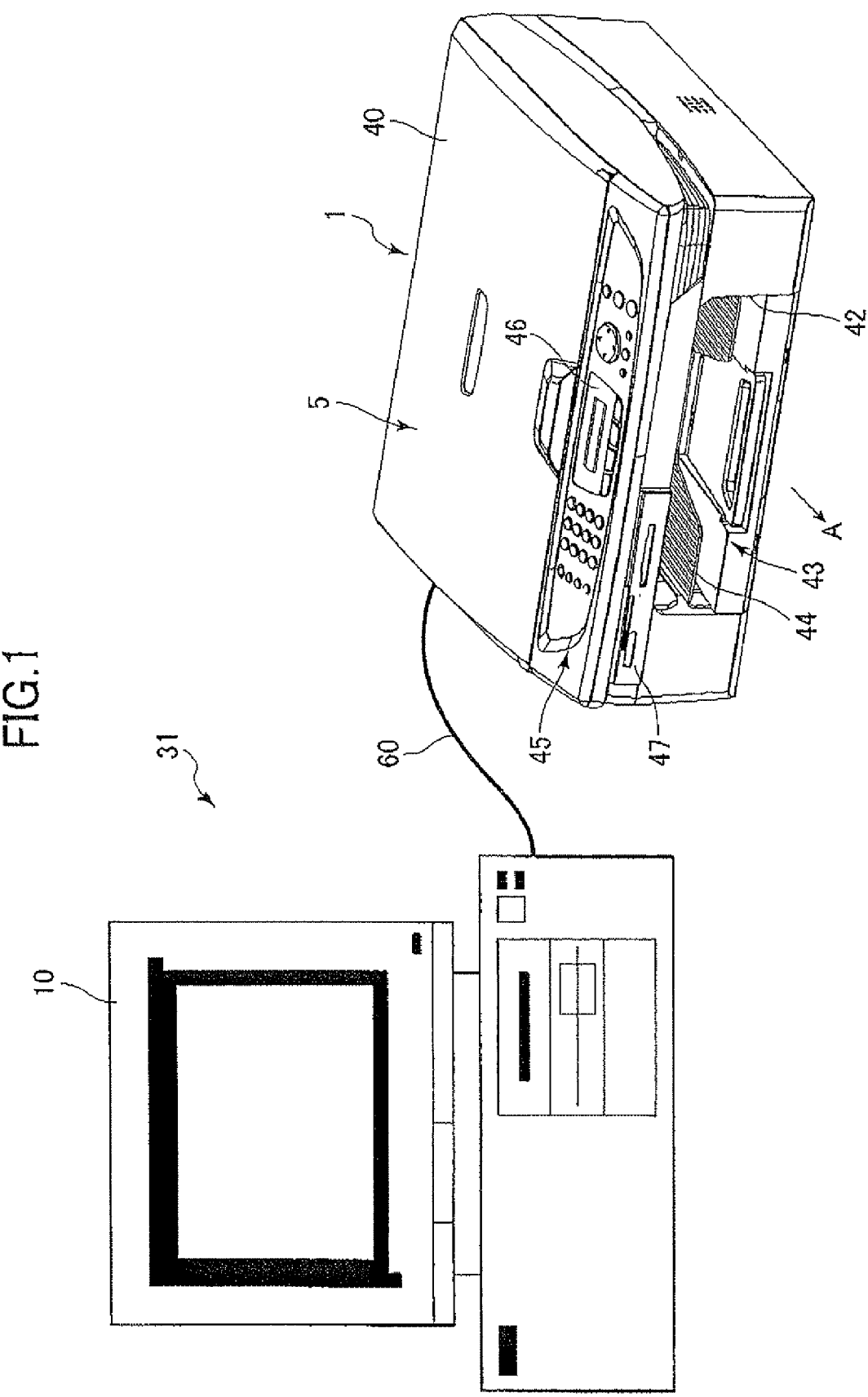
FIG. 1 is a perspective view of an image-forming device connected to a personal computer according to a first embodiment to which the color conversion device of the present invention is applied.

Next, embodiments of the present invention will be described while referring to the accompanying drawings. FIG. 1 is a perspective view of an image-forming device 40 connected to a personal computer (PC) 10, which is a first embodiment of a color conversion device according to the present invention.

The PC 10 according to the first embodiment functions to convert RGB input values configured of red, green, and blue color component values to CMYK output values configured of cyan, magenta, yellow, and black color component values.

The PC 10 transfers print data including the CMYK output values to the image-forming device 40. The image-forming device 40 is configured of an inkjet printer that forms images by ejecting CMY ink (chromatic ink) and K ink (achromatic ink) onto a recording paper based on the print data received from the PC 10. In this embodiment, the K ink used by the image-forming device 40 is pigment ink, while the chromatic CMY ink is configured of dye-based ink.

Pigment ink hag a lower fixing property to paper than dye-based ink. Hence, if an excessive amount of K ink is ejected onto the recording paper, the ink is not fixed to the recording paper, leading to various problems such as the ink being smeared by the user's fingers or depositing on and soiling other members in the image-forming device 40.

The PC 10 of this embodiment is configured to set the black component value K included in the CMYK output values to values appropriate for the type of recording paper. Accordingly, the K ink is less likely to separate from the recording paper in the image-forming device 40 and, hence, less likely to soil other members in the image-forming device 40 or smear on the recording paper.

As shown in FIG. 1, an opening 42 is formed in the front surface of the body of the image-forming device 40. The opening 42 is partitioned vertically. A paper cassette 43 capable of accommodating a plurality of stacked sheets of recording paper is inserted in the lower partitioned section of the opening 42. The upper partitioned section of the opening 42 constitutes a discharge section 44 in which printed sheets of recording paper are discharged. The printed sheets of recording paper are discharged in the direction indicated by an arrow A.

Disposed above the opening 42 on the top front surface of the image-forming device 40 are operating keys 45, and a liquid crystal display (LCD) 46 for displaying menus, operating procedures, and the status of operations. By pressing the operating keys 45, the user can perform various operations, including powering the image-forming device 40 on and off and switching functions.

Memory card slots 47 are provided in the front surface of the opening 42 below the operating keys 45. Memory cards can be inserted into and removed from the memory card slots 47. A USB interface 48 (see FIG. 2) is provided on the rear surface of the opening 42. One end of a USB cable 60 is connected to the USB interface 48, while the other end is connected to a USB interface 16 (see FIG. 2) of the PC 10, enabling the image-forming device 40 and PC 10 to perform data communications via the USB cable 60.

Figure 2:
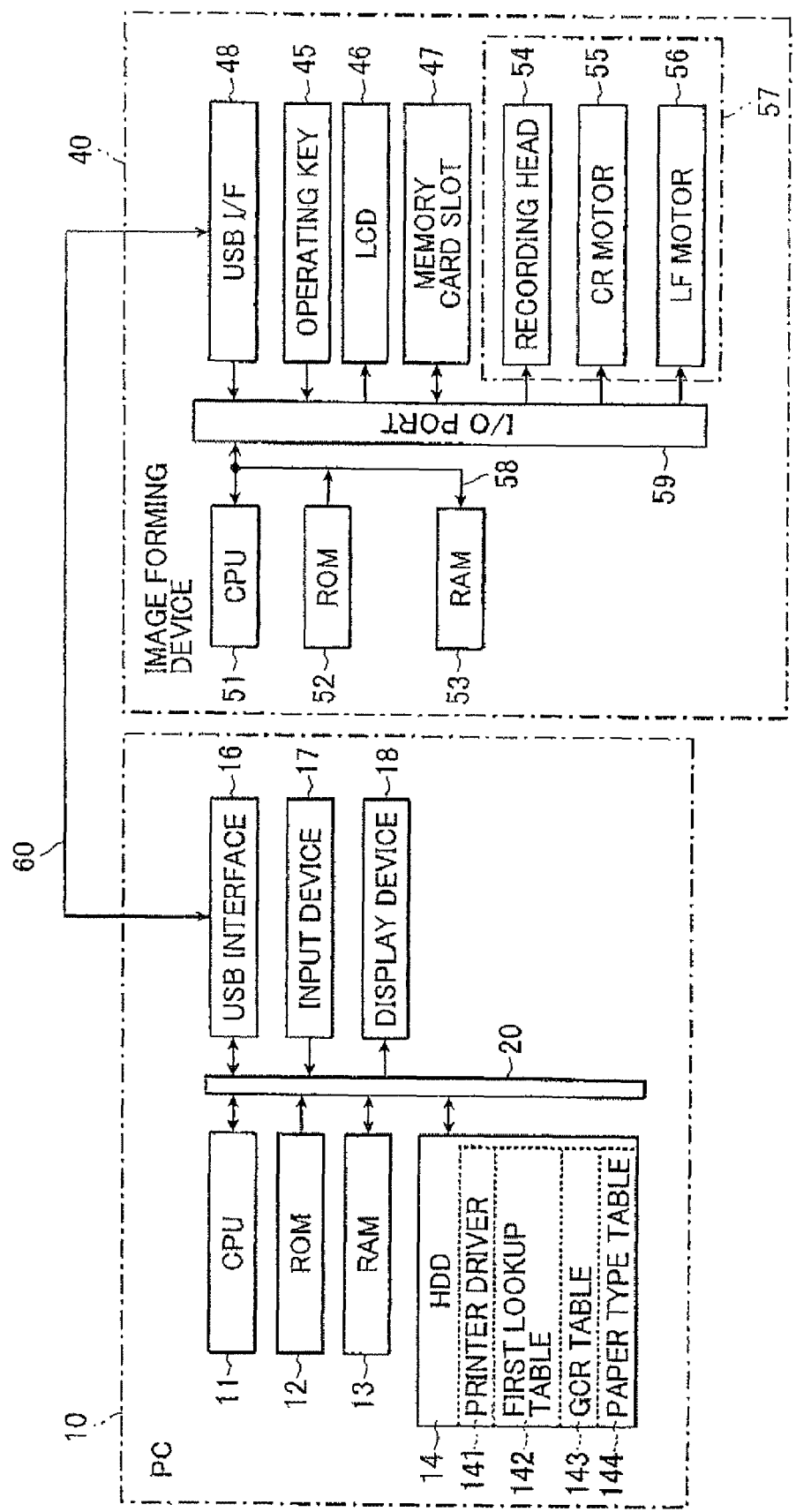
FIG. 2 is a block diagram showing an electrical structure of the personal computer and image-forming device.

FIG. 2 is a block diagram conceptually illustrating the electrical structure of the PC 10 according to the first embodiment and the image-forming device 40 connected to the PC 10.

As shown in FIG. 2, the PC 10 primarily includes a CPU 11, a ROM 12, a RAM 13, a hard disk drive (HDD) 14, the USB interface 16, an input device 17, and a display device 18, all of which are interconnected via a bus line 20.

The CPU 11 controls each component connected to the bus line 20 according to fixed values and programs stored in the ROM 12, RAM 13, and HDD 14. The ROM 12 is memory used to store programs and the like for controlling the operations of the PC 10. The RAM 13 is read/write memory for temporarily storing data and the like required in processes executed by the CPU 11.

A printer driver 141 is installed on the HDD 14 for implementing a page printing process (S1) described later with reference to FIGS. 5 and 6. The HDD 14 also stores a first lookup table 142, a GCR table 143, and a paper type table 144.

The first lookup table 142 stores CMY component values associated with RGB input values in order to match the colors displayed on the display device 18 of the PC 10 with colors formed on the image-forming device 40. The PC 10 converts RGB input values to first-order conversion data $C_1M_1Y_1$ by referencing the first lookup table 142. The minimum values for chromatic component values $C_1$, $M_1$, and $Y_1$ included in the first-order conversion data $C_1M_1Y_1$, i.e., the range in which each of the CMY colors overlap, is referred to as a gray component value minK. The gray component value minK corresponds to the gray component of the input value.

The GCR table 143 stores correction values that correspond to the minK. The GCR table 143 is used for determining the correction values ($\Delta C$, $\Delta M$, $\Delta Y$, $\Delta K$) corresponding to the minK. The GCR table 143 will be described later in greater detail with reference to FIG. 3.

The paper type table 144 stores adjustment parameters $a_1$ in association with types of recording paper.

The input device 17 is configured of a keyboard, mouse, and the like that enable the user to input instructions. The display device 18 is configured of a CRT display or liquid crystal display, for example, for visually displaying processing details, inputted data, and the like.

The image-forming device 40 further includes a CPU 51, a ROM 52 storing various control programs executed by the CPU 51 and data, and a RAM 53 for storing print data and control signals inputted from the PC 10 connected to the image-forming device 40. The CPU 51, ROM 52, and RAM 53 are interconnected via a bus line 58. The bus line 58 is also connected to an I/O port 59.

The I/O port 59 is connected to a drive unit 57 that includes a recording head 54, a carriage motor (CR motor) 55, and a line feed motor (LF motor) 56. The CR motor 55 supplies a drive force for reciprocating a carriage (not shown) supporting the recording head 54. The LF motor 56 rotates conveying rollers and discharge rollers used to convey the recording paper.

The CPU 51 develops print data received from the PC 10 into print data that the recording head 54 can print and outputs this developed data to the recording head 54 as ejection signals corresponding to each of the nozzles in the recording head 54. When driven by these ejection signals, the recording head 54 ejects ink from its nozzles to print images on recording paper. The CR motor 55 and LF motor 56 operate in synchronization with the ejection signals outputted to the recording head 54.

As mentioned above, ink is ejected onto the recording paper through nozzles formed in the recording head 54. CMYK ink is supplied to the recording head 54 from ink cartridges (not shown) and ejected from the nozzles to form images on recording paper.

The I/O port 59 is also connected to the operating keys 45, LCD 46, memory card slots 47, and USB interface 48, enabling the CPU 51 to control these components.

The PC 10 and image-forming device 40 are connected via the USB interfaces 16 and 48 and the USB cable 60, enabling the PC 10 and image-forming device 40 to communicate with each other.

Figures 3, 4:
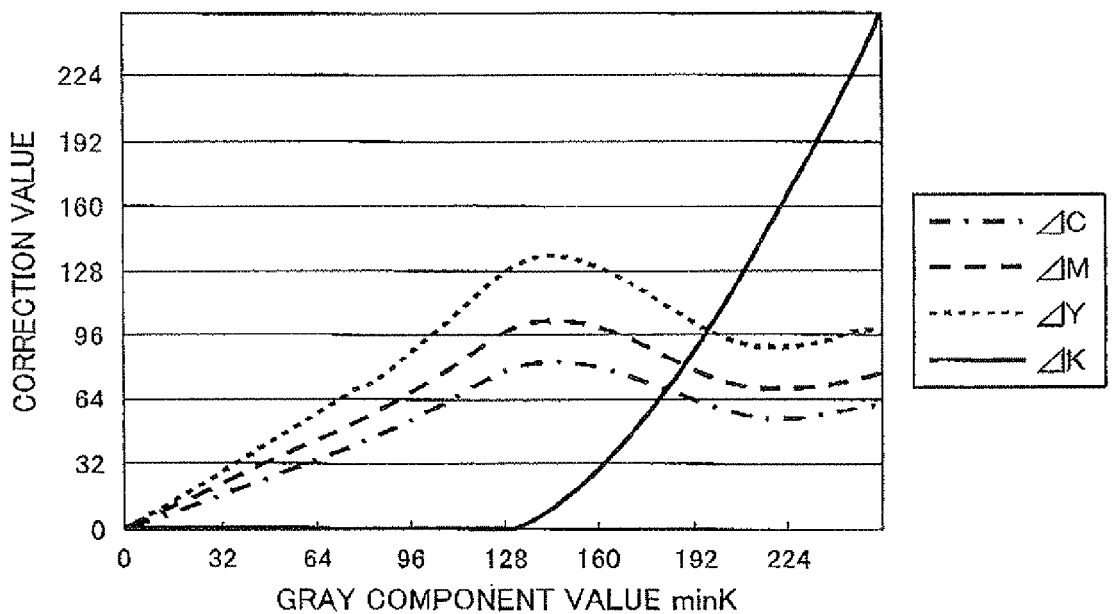
FIG. 3 is a graph of a GCR table according to the first embodiment.
FIG. 4 is an explanatory diagram showing an example of a paper type table according to the first embodiment.

Next, the GCR table is described with reference to FIG. 3. FIG. 3 is a graph showing an example of the GCR table 143. As shown in FIG. 3, the GCR table 143 stores correlations between the gray component value minK and CMYK correction values ($\Delta C$, $\Delta M$, $\Delta Y$, $\Delta K$).

The PC 10 corrects the first-order conversion data $C_1M_1Y_1$ using the correction values ($\Delta C$, $\Delta M$, $\Delta Y$, $\Delta K$) corresponding to the gray component value minK, as indicated in equations (1) through (4) below. Hence, through the calculations indicated in equations (1) through (4), the PC 10 can set color data $C_2M_2Y_2K_2$ corresponding to the RGB input values.

The following equations (1) through (4) are merely example calculations for finding color data $C_2M_2Y_2K_2$. The color data $C_2M_2Y_2K_2$ may be found using different calculations.

$$C_2 = C_1 - minK + \Delta C \quad (1)$$

$$M_2 = M_1 - minK + \Delta M \quad (2)$$

$$Y_2 = Y_1 - minK + \Delta Y \quad (3)$$

$$K_2 = \Delta K \quad (4)$$

In this embodiment, the data obtained by adding a black component value $K_1$ with a value of "0" to the first-order conversion data $C_1M_1Y_1$ obtained by converting the RGB input color data is referred to as first color data $C_1M_1Y_1K_1$. Further, data obtained by converting the RGB input color data using the gray component value minK and the correction values ($\Delta C$, $\Delta M$, $\Delta Y$, $\Delta K$) is referred to as second color data $C_2M_2Y_2K_2$. The value $K_2$ in this second color data $C_2M_2Y_2K_2$ is equivalent to $\Delta K$ (see equation (4)).

As shown in FIG. 3, $\Delta K$ is a value of 0 or greater and, when minK exceeds 128, rises as minK increases. Hence, the relationship $K_2 \geq K_1$ always holds for the first color data $C_1M_1Y_1K_1$ and second color data $C_2M_2Y_2K_2$ converted from the same input color data. In other words, the black component value $K_2$ in the second color data $C_2M_2Y_2K_2$ is always greater than or equal to the black component value $K_1$ included in the first color data $C_1M_1Y_1K_1$.

When second color data $C_2M_2Y_2K_2$ is found as described above, each component values $C_2$, $M_2$, $Y_2$, $K_2$ in this color data is adjusted by an adjustment parameter $a_1$ described later with reference to FIG. 4.

In the first embodiment, output color data CMYK including a black component value K suitable for the type of recording paper being used can be obtained by weighting the first color data $C_1M_1Y_1K_1$ having a relatively small black component value and the second color data $C_2M_2Y_2K_2$ having a relatively large black component value based on the adjustment parameter $a_1$ described later, as shown in equation (5) below.

$$CMYK = C_1M_1Y_1K_1 * a + C_2M_2Y_2K_2 * (1-a) \quad (5)$$

FIG. 4 shows an example of the paper type table 144. Of the types of recording paper in this example, "special paper" is paper that has undergone a special treatment to yield high image quality. This special paper has the best ink fixing property and can absorb a greater amount of ink than paper that has not been treated (hereinafter referred to as "normal paper"). Paper 1, Paper 2, and Paper 3 in this example are all normal paper, but differ in ink fixing capacity and total ink absorbency due to differences in the manufacturer and manufacturing method.

Further, the "fixing property of ink" can be measured by placing a transfer paper over the printed surface of a sheet of recording paper to be measured, rubbing the transfer paper against the printed surface with a prescribed pressure, and measuring the lightness of ink transferred to the transfer paper. The lightness will be low for recording paper having a low ink-fixing property since the amount of ink transferred from the printed surface is greater. In other words, a low value is obtained as the fixing property in this case. When the recording paper has a high ink-fixing property on the other hand, the lightness will be high since less ink is transferred from the printed surface to the transfer paper, resulting in a high value for the fixing property.

Further, the "fixing property of ink" differs not only according to the type of recording paper, but also according to whether the ink is a pigment ink or dye-based ink. In the description of this embodiment, the adjustment parameters $a_1$ are set based on the fixing property of K ink, which is pigment ink.

A smaller adjustment parameter $a_1$ is correlated with recording paper having a higher fixing property for K ink. As a result, the weighting of first color data $C_1M_1Y_1K_1$ is set smaller than the weighting of second color data $C_2M_2Y_2K_2$, which has a larger black component value than that of the first color data $C_1M_1Y_1K_1$. For example, since the special paper has a high ink-fixing property, "0.0" is stored as the adjustment parameter $a_1$. Consequently, the weighting of the first color data $C_1M_1Y_1K_1$ is "0", while the weighting of the second color data $C_2M_2Y_2K_2$ is "1" (see equation (5)), obtaining a high black component value. As a result, the density of the K ink can be increased to the limit, taking advantage of the properties of the recording paper to produce high-quality images.

On the other hand, higher values of the adjustment parameter $a_1$ are assigned to recording paper having a lower ink-fixing property. For example, since the Paper 1 has a low ink-fixing property, "1.0" is stored as the adjustment parameter $a_1$. Consequently, the weighting of the first color data $C_1M_1Y_1K_1$ is "1", while the weighting of the second color data $C_2M_2Y_2K_2$ is "0" (see equation (5)), producing CMYK output color data with a black component value of 0. In other words, the black component value is limited for recording paper having a low ink-fixing property, suppressing the various problems that can arise from a low ink-fixing property.

If the type of recording paper is not specified, the adjustment parameter $a_1$ associated with "Other" in the paper type table 144 is used.

The paper type table 144 is created and stored on the HDD 14 when the printer driver 141 is installed. In the description of this embodiment, a plurality of types of recording paper envisioned by the printer vendor and adjustment parameters $a_1$ corresponding to these types of recording paper are stored in the paper type table 144 at this time. However, the printer driver 141 may be configured for allowing the user to add new types of recording paper and their corresponding adjustment parameters $a_1$ to the paper type table 144 as needed.

Further, the PC 10 according to this embodiment does not perform the above weighting calculations for all types of recording paper, but prestores a special lookup table for specific types of recording paper (glossy paper, etc.) that can be used by the image-forming device 40 and performs color conversion processes using the lookup table. Hence, the PC 10 does not perform a weighting process based on the all types of recording paper. However, the PC 10 may be configured to execute the above weighting calculations for all types of recording paper.

Figure 5:
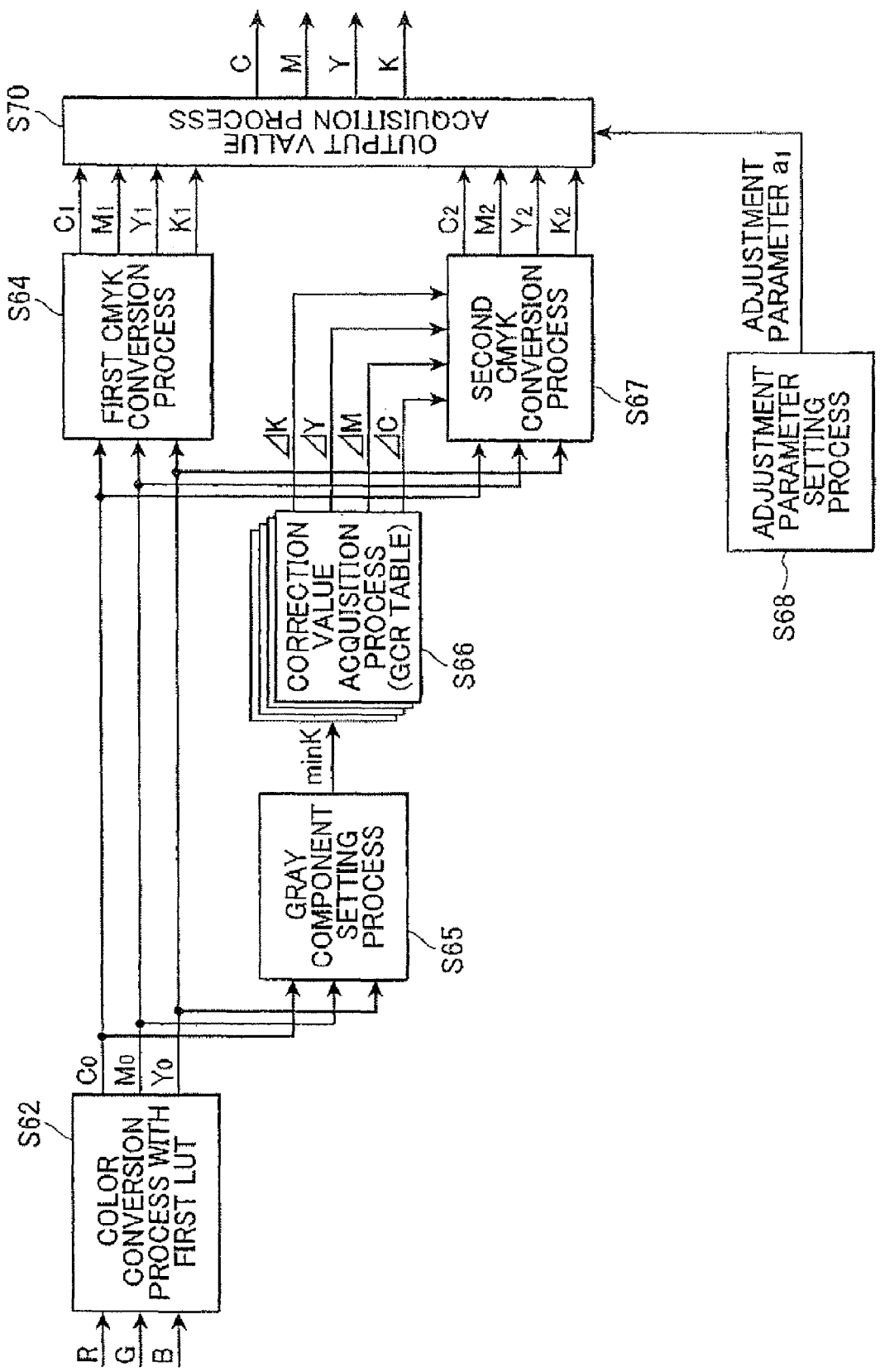
FIG. 5 is a block diagram showing functional units of a color conversion process executed on the personal computer.

FIG. 5 is a block diagram illustrating functional units of a color conversion process (S6) executed on the PC 10. The names and reference numbers for blocks shown in FIG. 5 correspond to the names and reference numbers assigned to each step in the color conversion process shown in the flowcharts of FIGS. 6 and 7.

First, in the color conversion process with a first lookup table (LUT) of S62, the PC 10 converts RGB input color data to first-order conversion data $C_1M_1Y_1$ based on relationships stored in the first lookup table 142 (see FIG. 2) and outputs the converted data.

In a first CMYK conversion process of S64, the PC 10 generates and outputs first color data $C_1M_1Y_1K_1$ produced by adding the black component value $K_1$ to the first-order conversion data $C_1M_1Y_1$ produced in the color conversion process of S62. The black component value $K_1$ added in this case is "0".

In a gray component setting process of S65, the PC 10 sets a gray component value minK for the first-order conversion data $C_1M_1Y_1$ based on the RGB input color data and outputs this gray component value minK.

In a correction value acquisition process of S66, the PC 10 acquires correction values ($\Delta C$, $\Delta M$, $\Delta Y$, $\Delta K$) corresponding to the gray component value minK by referencing the GCR table 143 (see FIG. 3), and outputs these correction values.

In a second CMYK conversion process of S67, the PC 10 converts the RGB input color data to second color data $C_2M_2Y_2K_2$ by correcting the first-order conversion data $C_1M_1Y_1$ using the gray component value minK set in the gray component setting process of S65 and the correction values ($\Delta C$, $\Delta M$, $\Delta Y$, $\Delta K$) obtained in the correction value acquisition process of S66. Specifically, the PC 10 performs the calculations shown in equations (1) through (4) in this second CMYK conversion process.

In an adjustment parameter setting process of S68, the PC 10 acquires an adjustment parameter $a_1$ corresponding to the type of paper to be used in an image forming process from the paper type table 144 and outputs this adjustment parameter $a_1$. The type of recording paper used in image formation is set based on user input.

In an output value acquisition process of S70, the PC 10 acquires CMYK output color data using the adjustment parameter $a_1$ to weight the first color data $C_1M_1Y_1K_1$ converted in the first CMYK conversion process of S64 and the second color data $C_2M_2Y_2K_2$ converted in the second CMYK conversion process of S67. The weighting calculation performed in the output value acquisition process of S70 is expressed by the equation (5) above.

By executing the color conversion process in this way, the PC 10 according to the first embodiment acquires the CMYK output color data by setting the adjustment parameter $a_1$ corresponding to the type of recording paper to be used and by weighting the first color data $C_1M_1Y_1K_1$ and the second color data $C_2M_2Y_2K_2$ having the black component value $K_2$ greater than or equal to the black component value $K_1$ included in the first color data $C_1M_1Y_1K_1$ for the same RGB input color data. Accordingly, the PC 10 can set the black component value K in the CMYK output color data to a value suited to the type of recording paper. Further, since weighting is performed using the adjustment parameter $a_1$ stored in association with the type of recording paper, less memory is required than a configuration storing suitable black component values K for each type of recording paper.

Figure 6:
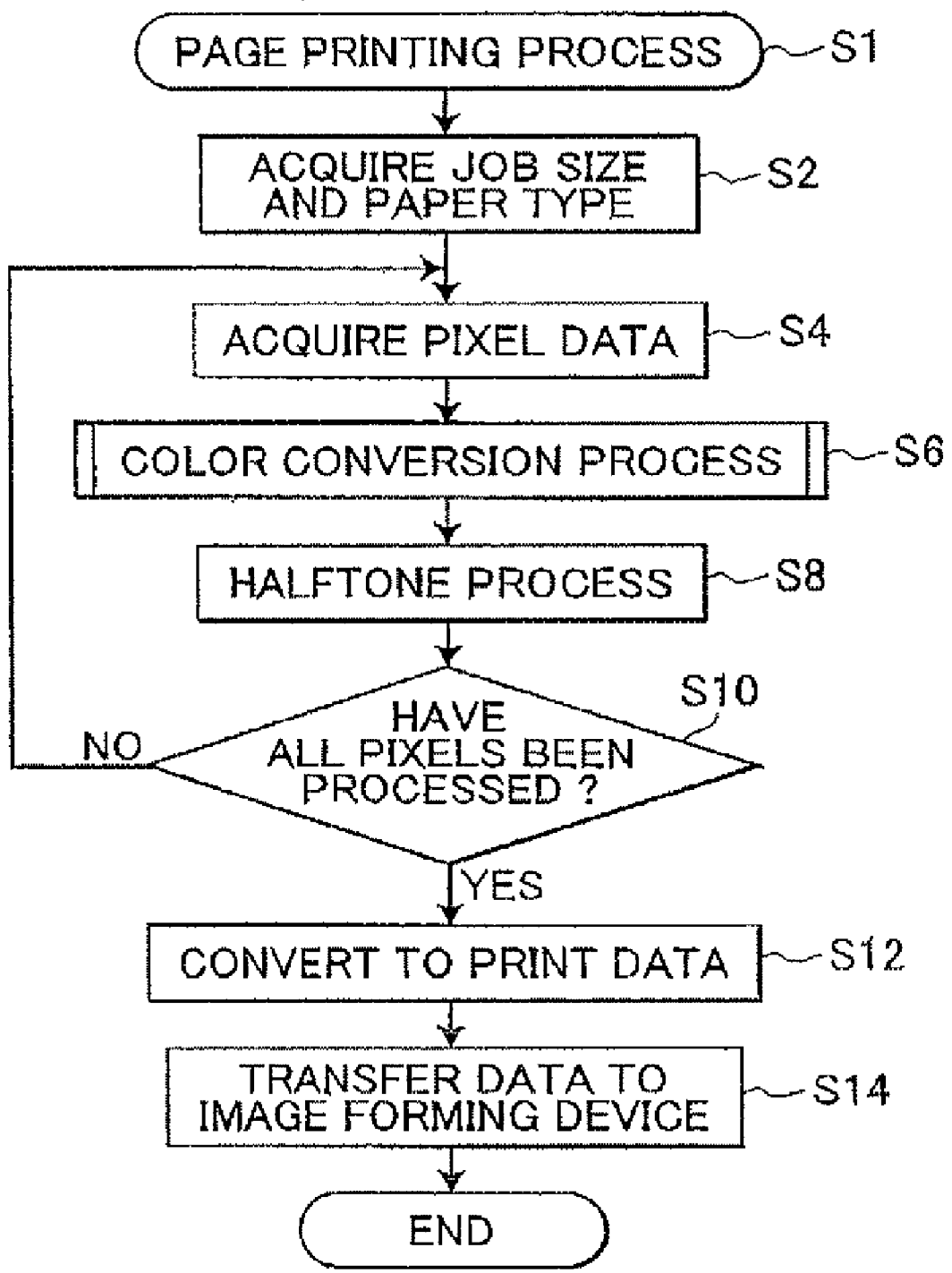
FIG. 6 is a flowchart illustrating steps in a page printing process executed on the personal computer.

FIG. 6 is a flowchart illustrating steps in a page printing process (S1) executed by the PC 10. The PC 10 executes the page printing process of S1 when target print data has been specified, and the user has issued a print command. The page printing process is performed to convert RGB input values to CMYK output values that are outputted to the image-forming device 40. The page printing process of S1 is executed for each page in the target print data. However, for the sake of description, only one page worth of data is included in the target print data in this example.

In S2 of the page printing process, the PC 10 first acquires data indicating the job size and paper type. The job size data indicates the size of the file targeted for printing, while the paper type data is inputted by the user when issuing the print command.

In S4 the PC 10 acquires one pixel worth of pixel data from the target print data as RGB values, and in S6 performs the color conversion process to convert the RGB input values to CMYK output values. The color conversion process of S6 will be described below in greater detail with reference to FIG. 7.

In S8 the PC 10 executes a halftone process on the CMYK output values acquired from the color conversion process and in S10 determines whether all pixels have been processed. If not all pixels have been processed (S10: NO), the PC 10 returns to S4, acquires the next pixel data, and repeats the process described above.

However, when all pixels have been processed after repeatedly performing the above steps (S10: YES), in S12 the PC 10 converts the CMYK output values for all pixels acquired above to print data, in S14 transfers the print data to the image-forming device 40, and subsequently ends the process. Upon receiving this print data, the image-forming device 40 ejects ink droplets in the colors CMYK onto recording paper based on this print data to form images on the paper.

Figure 7:
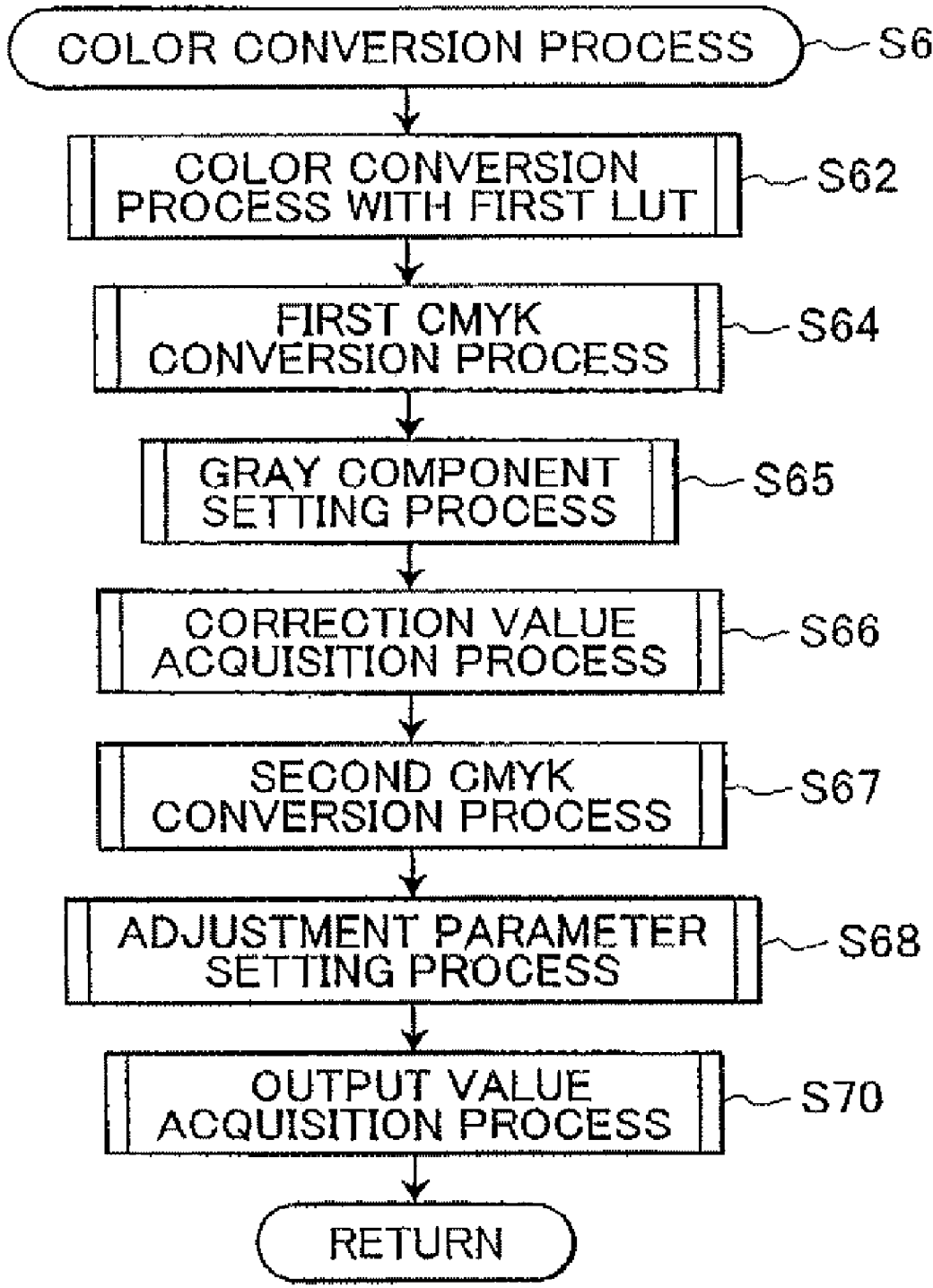
FIG. 7 is a flowchart illustrating steps in a color conversion process according to the first embodiment.

FIG. 7 is a flowchart illustrating steps in the color conversion process of S6. Since the details of steps S62-S70 in the color conversion process have already been described in detail with reference to the block diagram in FIG. 5, each step in the flowchart of FIG. 7 will only be described briefly.

In the color conversion process with the first LUT of S62, the PC 10 converts RGB input color data to first-order conversion data $C_1M_1Y_1$ based on relationships stored in the first lookup table 142 (see FIG. 2).

In the first CMYK conversion process of S64, the PC 10 generates first color data $C_1M_1Y_1K_1$ by adding the black component value $K_1$ having a value "0" to the first-order conversion data $C_1M_1Y_1$ and outputs this first color data $C_1M_1Y_1K_1$.

In the gray component setting process of S65, the PC 10 sets a gray component value minK and acquires correction values ($\Delta C$, $\Delta M$, $\Delta Y$, $\Delta K$) corresponding to this gray component value minK through the correction value acquisition process of S66. In the second CMYK conversion process of S67, the PC 10 converts the RGB input color data to second color data $C_2M_2Y_2K_2$ by correcting the first-order conversion data $C_1M_1Y_1$ using the gray component value minK and the correction values ($\Delta C$, $\Delta M$, $\Delta Y$, $\Delta K$).

In the adjustment parameter setting process of S68, the PC 10 acquires an adjustment parameter $a_1$ corresponding to the type of recording paper to be used from the paper type table 144. In the output value acquisition process of S70, the PC 10 acquires CMYK output color data using the adjustment parameter $a_1$ to weight the first color data $C_1M_1Y_1K_1$ and the second color data $C_2M_2Y_2K_2$.

Through the color conversion process of S6 according to the first embodiment, the PC 10 can set the black component value K included in the CMYK output color data to a value suited to the type of recording paper.

Further, since the second color data $C_2M_2Y_2K_2$ corrected based on the gray component value minK is weighted based on the adjustment parameter $a_1$ corresponding to the type of recording paper and reflected in the CMYK output color data, the PC 10 avoids a drop in image quality (color tone accuracy), while reducing the amount of memory required for the gray component.

The efficiency of the process is also improved since the first-order conversion data $C_1M_1Y_1$ converted in the color conversion process with the first LUT of S62 is reflected in both the first color data $C_1M_1Y_1K_1$ and second color data $C_2M_2Y_2K_2$.

Further, since an achromatic component value suited to the type of recording paper is found from both the relationships stored in the first lookup table 142 (see FIG. 2) and the relationships stored in the GCR table 143 (see FIG. 3), less memory is required than when storing suitable black component values for each type of recording paper.

Figure 8:
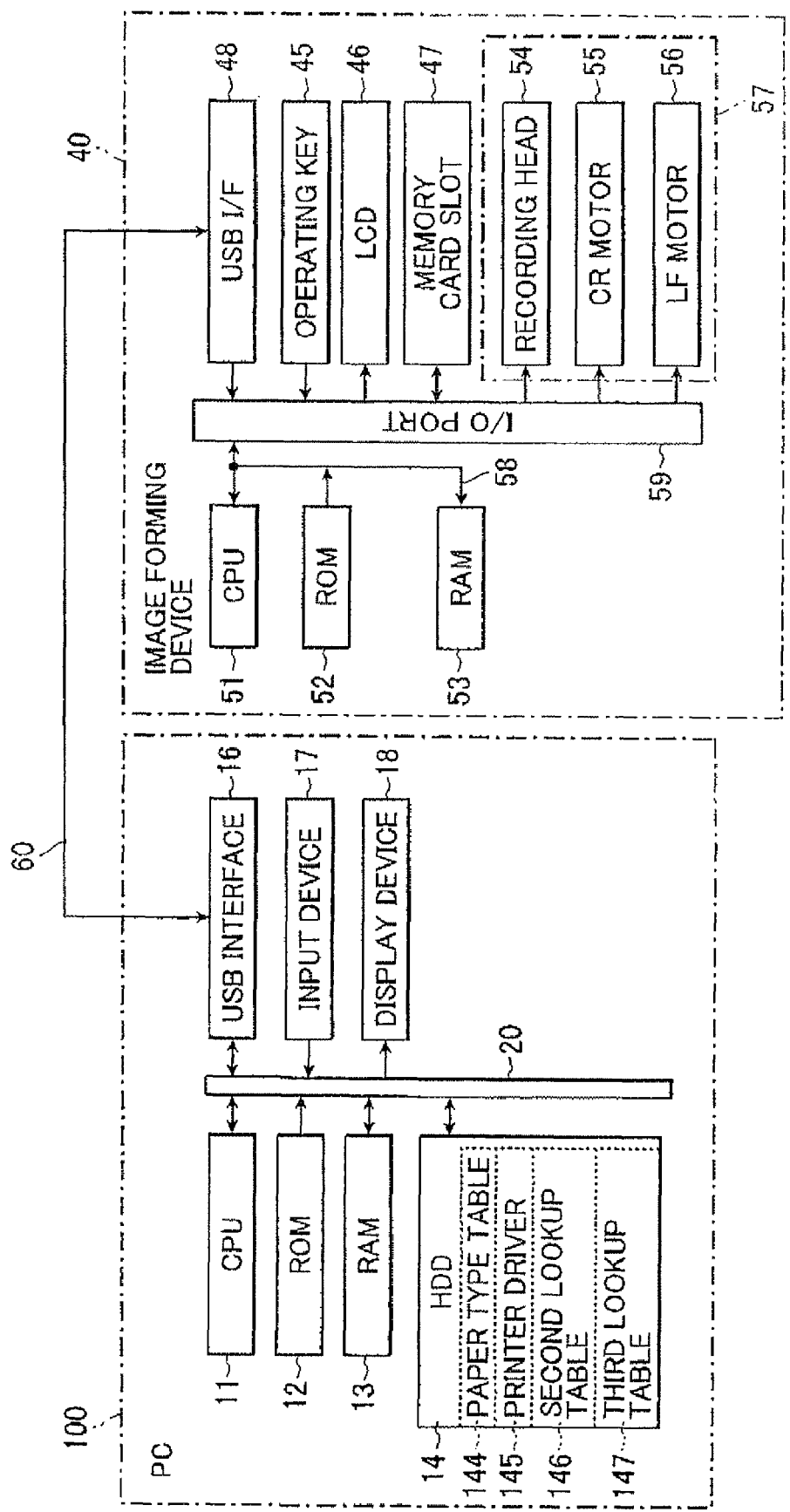
FIG. 8 is a block diagram corresponding to FIG. 2 showing an image-forming device connected to a personal computer according to a second embodiment.

Next, a second embodiment of the present invention will be described while referring to FIGS. 8 to 10. FIG. 8 is a block diagram corresponding to FIG. 2 showing a personal computer 100 according to a second embodiment of the present invention connected to the image-forming device 40, wherein like parts and components are designated with the same reference numerals to avoid duplicating description.

Figure 10:
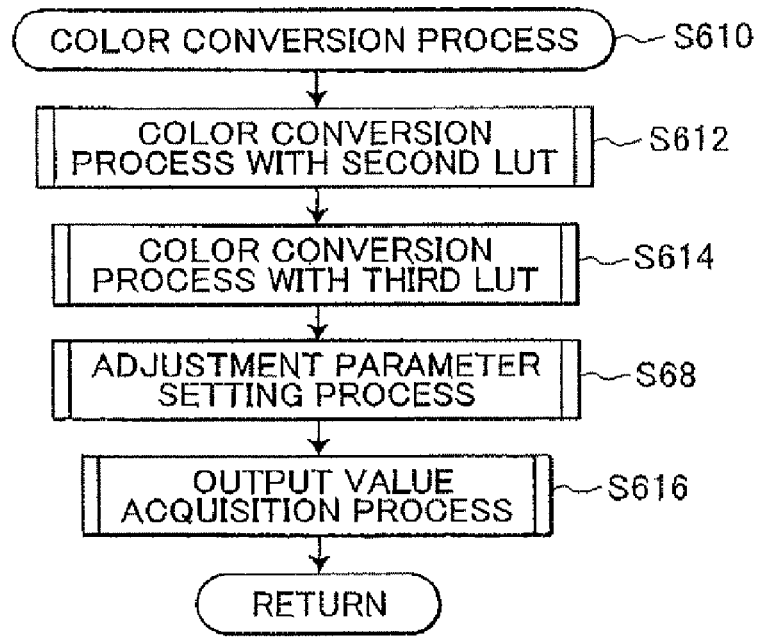
FIG. 10 is a flowchart illustrating steps in a color conversion process according to the second embodiment.

As shown in FIG. 8, a printer driver 145 is installed on the HDD 14 of the personal computer 100 according to the second embodiment in place of the printer driver 141 installed on the PC 10 in the first embodiment for executing a color conversion process (S610) shown in FIG. 10. The HDD 14 also stores a second lookup table 146 and a third lookup table 147.

The second lookup table 146 stores relationships between the black component value $K_1$ and the chromatic component values $C_1$, $M_1$, and $Y_1$ corresponding to the RGB input color data. In the second embodiment, data acquired by converting RGB input color data according to the relationships stored in the second lookup table 146 is referred to as the first color data $C_1M_1Y_1K_1$.

The third lookup table 147 stores relationships between the black component value $K_2$ and the chromatic component values $C_2$, $M_2$, and $Y_2$ for RGB input color data. In the second embodiment, data acquired by converting RGB input color data based on the relationships stored in the third lookup table 147 is referred to as the second color data $C_2M_2Y_2K_2$.

The second and third lookup tables 146 and 147 are similar in that they store relationships between black component values and chromatic component values for RGB input color data in order to match colors displayed on the display device 18 of the PC 10 to colors formed on the image-forming device 40. However, the second and third lookup tables 146 and 147 are created to maintain the relationship $K_2 \geq K_1$ at all times for black component values $K_1$ and $K_2$ for the same RGB input color data. In other words, the black component value in the second color data $C_2M_2Y_2K_2$ corresponding to the RGB input color data is greater than or equal to the black component value in the first color data $C_1M_1Y_1K_1$ for the same RGB input color data.

Figure 9:
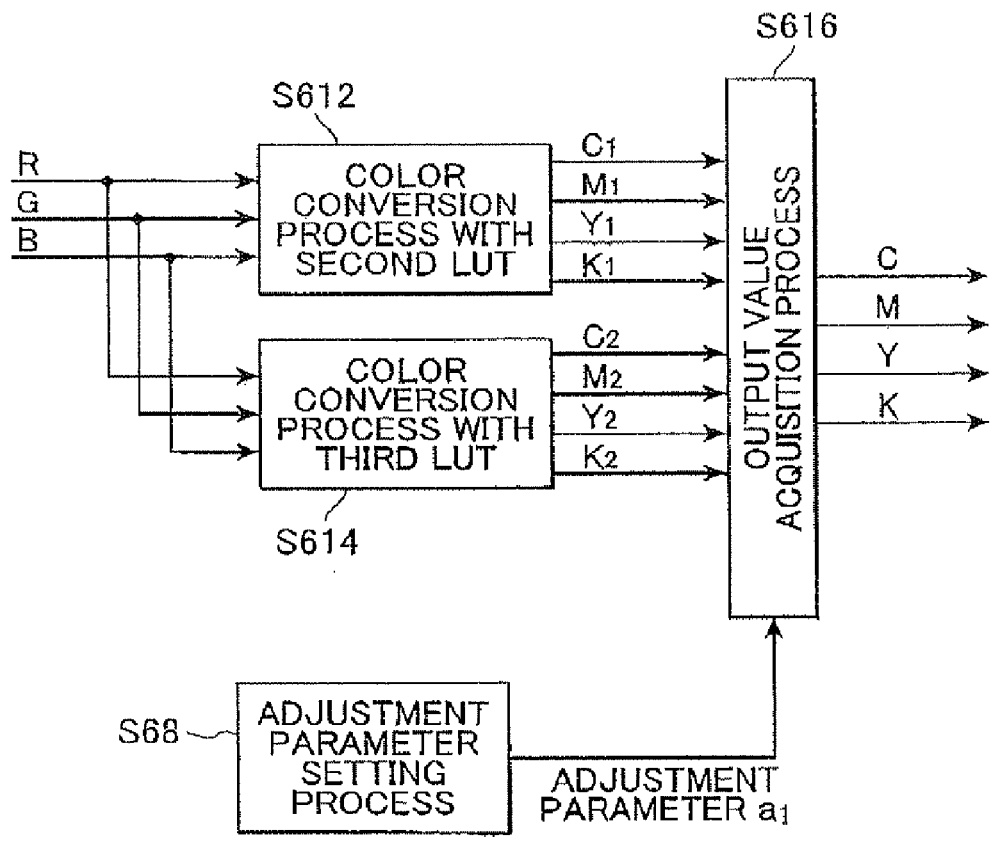
FIG. 9 is a block diagram corresponding to FIG. 5 showing functional units of a color conversion process executed on the personal computer of the second embodiment.

FIG. 9 is a block diagram showing functional units of a color conversion process (S610) executed by the personal computer 100 according to the second embodiment and corresponds to FIG. 5 in the first embodiment.

First, in a CMYK conversion process with the second LUT of S612, the personal computer 100 converts RGB input color data to first color data $C_1M_1Y_1K_1$ according to the relationships stored in the second lookup table 146, and outputs the converted data.

In the CMYK conversion process with the third LUT in S614, the personal computer 100 converts RGB input color data to second color data $C_2M_2Y_2K_2$ based on relationships stored in the third lookup table 147, and outputs the converted data.

In the adjustment parameter setting process of S68, as described above in the first embodiment, the personal computer 100 acquires an adjustment parameter $a_1$ corresponding to the type of recording paper targeted for image formation from the paper type table 144 and outputs this adjustment parameter $a_1$.

In the output value acquisition process of S616, the PC 10 acquires CMYK output color data using the adjustment parameter $a_1$ to weight the first color data $C_1M_1Y_1K_1$ converted in the CMYK conversion process of S612 and the second color data $C_2M_2Y_2K_2$ converted in the CMYK conversion process of S614. The calculation performed in the process of S616 is expressed by the equation (5) described above in the first embodiment.

FIG. 10 is a flowchart illustrating steps in the color conversion process of S610 according to the second embodiment. In the second embodiment, the color conversion process of S610 is executed in place of the color conversion process of S6 according to the first embodiment.

Since steps S612, S614, S68, and S616 in the color conversion process shown in FIG. 10 have already been described in detail with reference to the block diagram in FIG. 9, only a brief description will be given for the steps in this flowchart.

First, in the color conversion process with the second LUT of S612, the personal computer 100 converts RGB input color data to first color data $C_1M_1Y_1K_1$ based on relationships stored in the second lookup table 146 (see FIG. 8).

In the color conversion process with the third LUT of S614, the personal computer 100 converts the RGB input color data to second color data $C_2M_2Y_2K_2$ based on relationships stored in the third lookup table 147.

In the adjustment parameter setting process of S68 the personal computer 100 acquires an adjustment parameter $a_1$ corresponding to the type of recording paper to be used in image formation from the paper type table 144. In the output value acquisition process of S616, the personal computer 100 acquires CMYK output color data using the adjustment parameter $a_1$ to weight the first color data $C_1M_1Y_1K_1$ and second color data $C_2M_2Y_2K_2$.

Since the personal computer 100 described above finds a black component value suited to the type of recording paper based on the second and third lookup tables 146 and 147 and the paper type table 144, the personal computer 100 uses less memory than a construction that stores suitable black component values for each type of recording paper.

Further, both the first color data $C_1M_1Y_1K_1$ and the second color data $C_2M_2Y_2K_2$ are values found using the second and third lookup tables 146 and 147 preset to match colors displayed on the display device 18 of the personal computer 100 to colors formed on the image-forming device 40. Hence, by using CMYK output color data obtained with the first and second color data, the image-forming device 40 can form images in colors that appear faithful to colors displayed on the display device 18 of the personal computer 100. In other words, it is possible to find both black component values suited to the type of recording paper being used and chromatic component values suited to the black component values.

Figure 11:
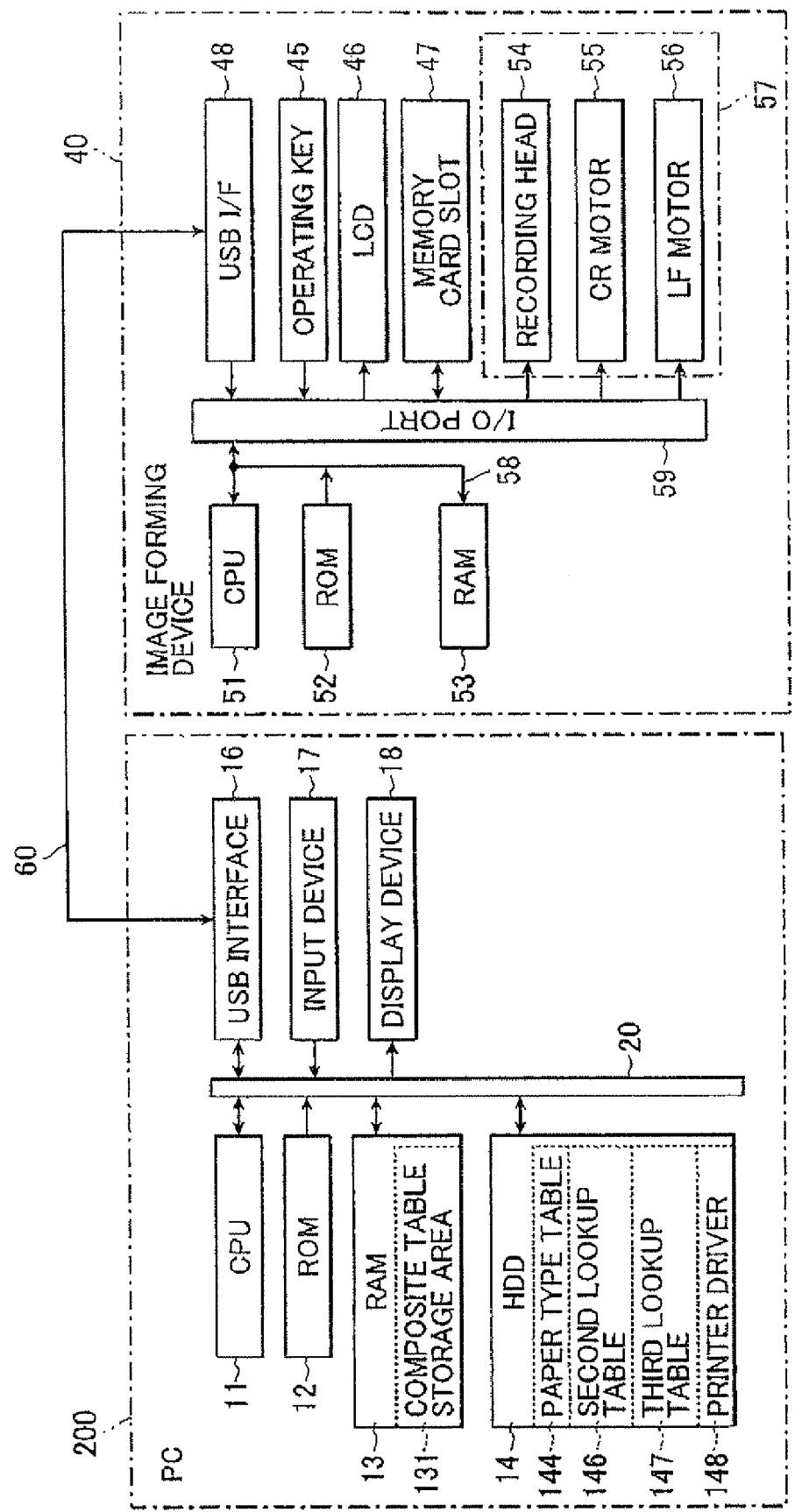
FIG. 11 is a block diagram corresponding to FIG. 2 showing an image-forming device connected to a personal computer according to a third embodiment.

Next, a third embodiment of the present invention will be described. FIG. 11 is a block diagram corresponding to FIG. 2 showing a PC 200 according to the third embodiment connected to the image-forming device 40, where like parts and components are designated with the same reference numerals to avoid duplicating description.

As shown in FIG. 11, a printer driver 148 is installed on the HDD 14 of the PC 200 according to the third embodiment in place of the printer driver 141 installed on the PC 10 according to the first embodiment for executing a page printing process (S71) shown in FIG. 13.

In addition, the RAM 13 is provided with a composite table storage area 131 for storing a composite table.

Figure 12:
FIG. 12 is an explanatory diagram illustrating the relationships among a second lookup table, a third lookup table, and a composite table created based on the second and third lookup tables.

FIG. 12 is an explanatory diagram showing relationships between the second lookup table 146, the third lookup table 147, and a composite table 150 created based on the second and third lookup tables 146 and 147. As shown in FIG. 12, the composite table 150 stores relationships between RGB input color data and CMYK output color data. The composite table 150 is created based on first color data $C_1M_1Y_1K_1$ stored in the third lookup table 146 and second color data $C_2M_2Y_2K_2$ stored in the fourth lookup table 147.

As shown in FIG. 12, the same control numbers have been assigned to the same RGB input color data in the second and third lookup tables 146 and 147. The first and second color data $C_1M_1Y_1K_1$ and $C_2M_2Y_2K_2$ are read for each control number, and relationships between the RGB input color data and CMYK output color data to be stored in the composite table 150 are set by weighting the color component values based on the adjustment parameter $a_1$. CMYK output color data corresponding to RiGiBi input color data for control number i is calculated according to equation (6) below.

$$(C,M,Y,K)=a_1*(C_{1i},M_{1i},Y_{1i},K_{1i})+(1-a_1)*(C_{2i},M_{2i},Y_{2i},K_{2i}) \qquad (6)$$

The composite table 150 is created by setting relationships between this input color data and the CMYK component values for all control numbers.

As described above, the relationship $K_2 \geqq K_1$ is maintained for the second and third lookup tables 146 and 147. Accordingly, relationships correlating CMYK output color data including a black component value K suited to the type of recording paper and the RGB input color data can be stored in the composite table 150.

The second and third lookup tables 146 and 147 are predetermined to match colors displayed on the PC 200 with colors formed on the image-forming device 40. Accordingly, relationships between the CMYK output color data and the RGB input color data can be stored in the composite table 150 for forming images on the image-forming device 40 having colors that do not appear to deviate from colors displayed on the personal computer 200 when using the composite table 150.

Figure 13A:
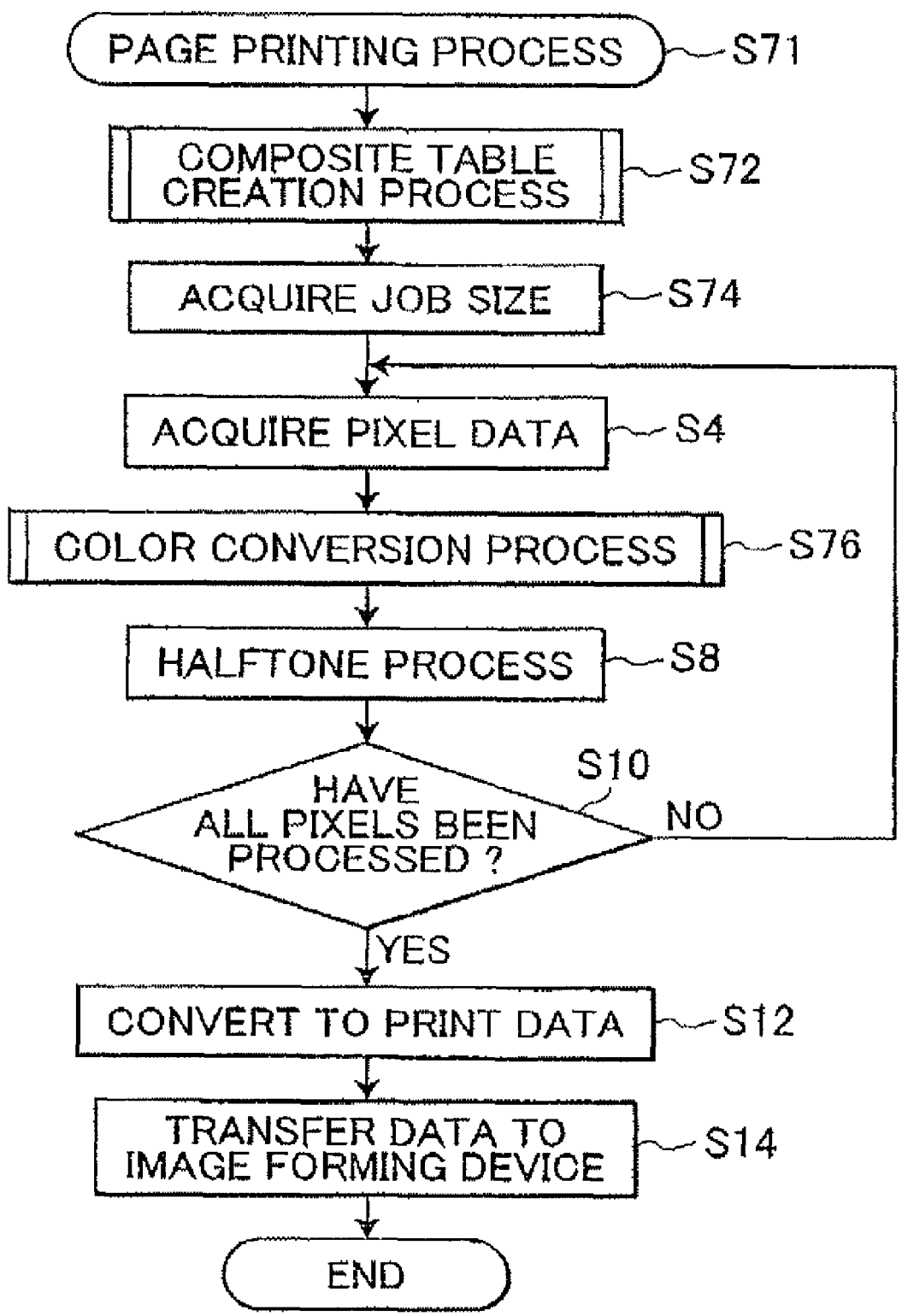
FIG. 13A is a flowchart illustrating steps in a page printing process executed on the personal computer according to the third embodiment.

FIG. 13A is a flowchart illustrating steps in the page printing process of S71 executed on the PC 200 according to the third embodiment and corresponds to the page printing process in FIG. 6. Steps in the page printing process of S71 shown in FIG. 13A that are similar to the page printing process of S1 described with reference to FIG. 6 have been designated with the same step numbers, and a description of these steps has been omitted or abbreviated.

In S72 of the page printing process in FIG. 13(a), the PC 200 executes a composite table creation process for creating the composite table 150 (see FIG. 12). The composite table creation process will be described later in greater detail with reference to FIG. 13B.

In S74 the PC 200 acquires data indicating the job size, i.e., the size of the file targeted for printing, as described earlier. In S4 the PC 200 acquires one pixel worth of pixel data from the target print data as RGB input color data. In S76 the PC 200 executes a color conversion process to convert the RGB input color data to CMYK output color data. The color conversion process of S76 is performed to convert RGB input color data to CMYK output color data based on relationships stored in the composite table 150.

In S8-S14 the PC 200 performs the same processes described in S8-S14 of the page printing process according to the first embodiment (S1; see FIG. 6).

Through the page printing process according to the third embodiment, the PC 200 finds a black component value suited to the type of recording paper from both relationships stored in the second lookup table 146 and relationships stored in the third lookup table 147. Further, as described in the first and second embodiments, the PC 200 according to the third embodiment uses less memory than a construction storing suitable achromatic component values for each type of recording paper.

Further, calculating the color data based on the adjustment parameter suited to the type of recording paper is only performed when beginning a printing process on the recording paper and need not be performed for each pixel in the image. This further improves processing speed over the technologies in the first and second embodiments, particularly when printing large images.

FIG. 13B is a flowchart illustrating steps in the composite table creation process of S72. In S721 at the beginning of the composite table creation process, the PC 200 sets an adjustment parameter $a_1$ corresponding to the type of recording paper. Since this process is identical to the adjustment parameter setting process of S68 described in the first and second embodiments, a description of this process will not be repeated.

In S722 the PC 200 acquires the sixes of the second and third lookup tables 146 and 147. Specifically, the PC 200 acquires the maximum control number i (see FIG. 12).

In S723 the PC 200 combines the values in the third and fourth lookup tables 146 and 147 using the adjustment parameter $a_1$ to weight values (C1$i$, M1$i$, Y1$i$, K1$i$) in the second lookup table 146 and values (C2$i$, M2$i$, Y2$i$, K2$i$) in the third lookup table 147. The calculation in S723 is performed according to the equation (6) above.

In S724 the PC 200 determines whether the process has been performed for all control numbers i. If the process has not been performed for all control numbers i (S724: NO), the PC 200 returns to S723 and repeats the process for the next control number i.

When the process has been completed for all control numbers i after being repeatedly performed (S724: YES), in S726 the PC 200 saves the created composite table 150 in the composite table storage area 131 (see FIG. 11) and ends the process.

Figure 14:
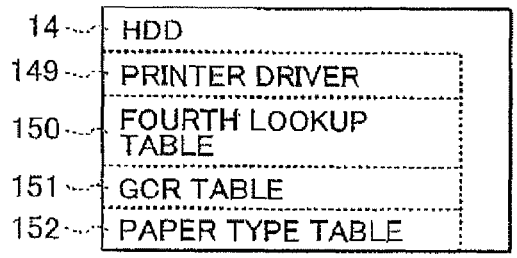
FIG. 14 is a block diagram conceptually illustrating the content of a hard disk drive on a personal computer according to a fourth embodiment.

Next, a fourth embodiment of the present invention will be described. FIG. 14 is a block diagram conceptually illustrating the HDD 14 of the PC 10 according to the fourth embodiment. The PC 10 and the image-forming device 40 according to the fourth embodiment differ from that of the first embodiment only in the configuration of the HDD 14. Since the remaining structure is identical to the PC 10 and the image-forming device 40 in the first embodiment, only the HDD 14 will be described below.

Figure 15:
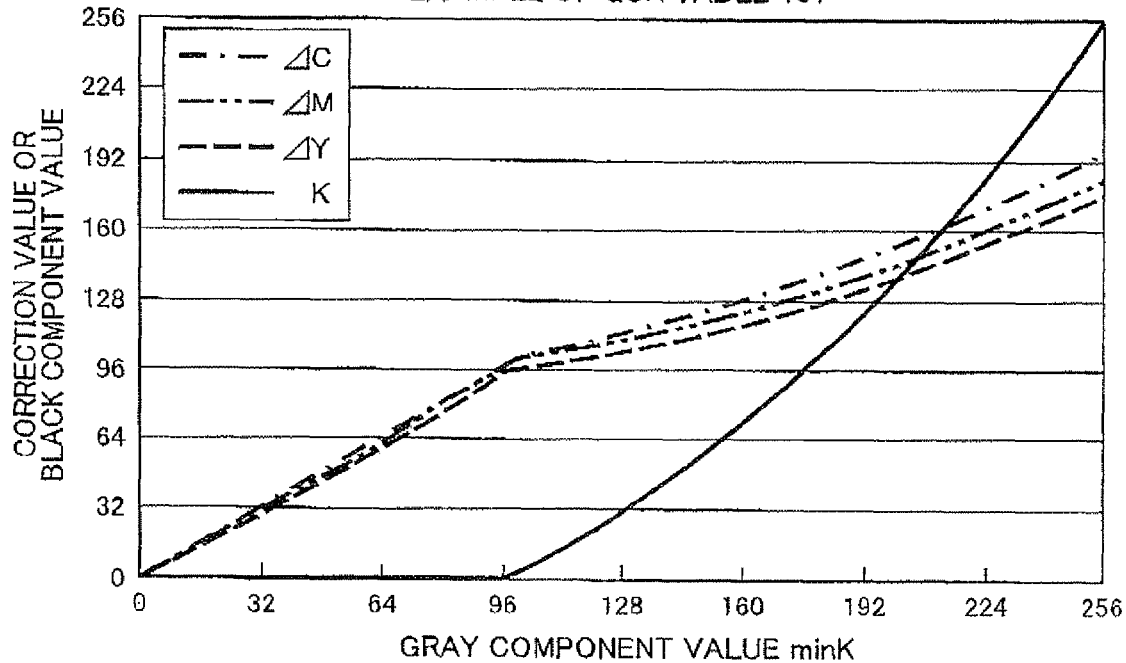
FIG. 15 is a graph of a GCR table according to the fourth embodiment.

As shown in FIG. 14, the HDD 14 according to the fourth embodiment stores a printer driver 149, a fourth lookup table 150, a GCR table 151, and a paper type table 152. The printer driver 149 is installed on the HDD 14 according to the fourth embodiment in place of the printer driver 141 in the first embodiment for executing a color conversion process (S80) shown in FIG. 17. The fourth lookup table 150 stores CMY component values associated with RGB input values in order to match the colors displayed on the display device 18 of the PC 10 with colors formed on the image-forming device 40. FIG. 15 shows an example of the GCR table 151 used in the fourth embodiment.

When the density of K ink is simply limited based on the fixing property of the recording paper, as in FIG. 3 of the first embodiment, a phenomenon called color inversion can occur. In color inversion, dark, dense colors originally having a large gray component are rendered lighter than light colors.

To describe color inversion in greater detail, when using the GCR table 143 shown in FIG. 3, the density of K ink increases as the gray component increases, i.e., as the color tone grows darker, but the densities of CMY inks decrease when a minK is greater than about 128. Put another way, the densities of CMY inks are higher for brighter colors having a low gray component. Hence, if only the density of K ink is reduced when using recording paper with a poor fixing property, dark colors ordinarily rendered with a large gray component now have a smaller quantity of ink than light colors with a small gray component. As a result, the dark colors are rendered as light colors. This is the phenomenon of color inversion.

In order to prevent such color inversion, it is conceivable to prestore the GCR table shown in FIG. 3 for each type of recording paper. In other words, the densities of K ink suited to the fixing properties of recording paper and the densities of CMY ink corresponding to the densities of K ink are prestored. However, since this method requires that tables be created and stored for all possible types of recording paper that can be used on the image-forming device, the number of steps required for creating the color tables and the amount of memory usage would be enormous.

In light of this problem, the GCR table 151 described with reference to FIG. 15 is used in the fourth embodiment. FIG. 15 is a graph showing sample correlations between the gray component value minK and correction values and a black component value K. As shown in FIG. 15, the GCR table 143 stores predetermined correlations between the gray component value minK, CMY correction values ($\Delta C$, $\Delta M$, $\Delta Y$), and the black component value K.

The PC 10 corrects the first-order conversion data $C_1 M_1 Y_1$ using the correction values ($\Delta C$, $\Delta M$, $\Delta Y$) corresponding to the gray component value minK, as indicated in equations (1) through (3) as described in the first embodiment. The PC 10 also directly sets the black component value K corresponding to the gray component value minK as the black component value $K_2$ corresponding to the RGB input values, as shown in equation (4') below. Hence, through the calculations indicated in equations (1) through (4'), the PC 10 can set second color data $C_2 M_2 Y_2 K_2$ corresponding to the RGB input values.

$$K_2 = K \quad (4')$$

As shown in FIG. 15, the correction values ($\Delta C$, $\Delta M$, $\Delta Y$) stored in the GCR table 151 increases as the gray component value minK increases. In other words, the correction values ($\Delta C$, $\Delta M$, $\Delta Y$) are determined such that the slopes of functions expressing correction values ($\Delta C$, $\Delta M$, $\Delta Y$), i.e., $\Delta C = f_c(minK)$, $\Delta M = f_m(minK)$, and $\Delta Y = f_y(minK)$, are always 0 or greater. Put another way, the $\Delta C$, $\Delta M$, and $\Delta Y$ can be predetermined so that the chromatic component values $C_2$, $M_2$, and $Y_2$ increase as the gray component value minK increases.

When the second color data $C_2 M_2 Y_2 K_2$ is found as described above, the black component value $K_2$ in this color data is limited by an adjustment parameter $a_2$ described later with reference to FIG. 16. On the other hand, chromatic component values $C_2$, $M_2$, and $Y_2$ are adjusted by total ink quantities b described later with reference FIG. 16.

Figures 16, 17:
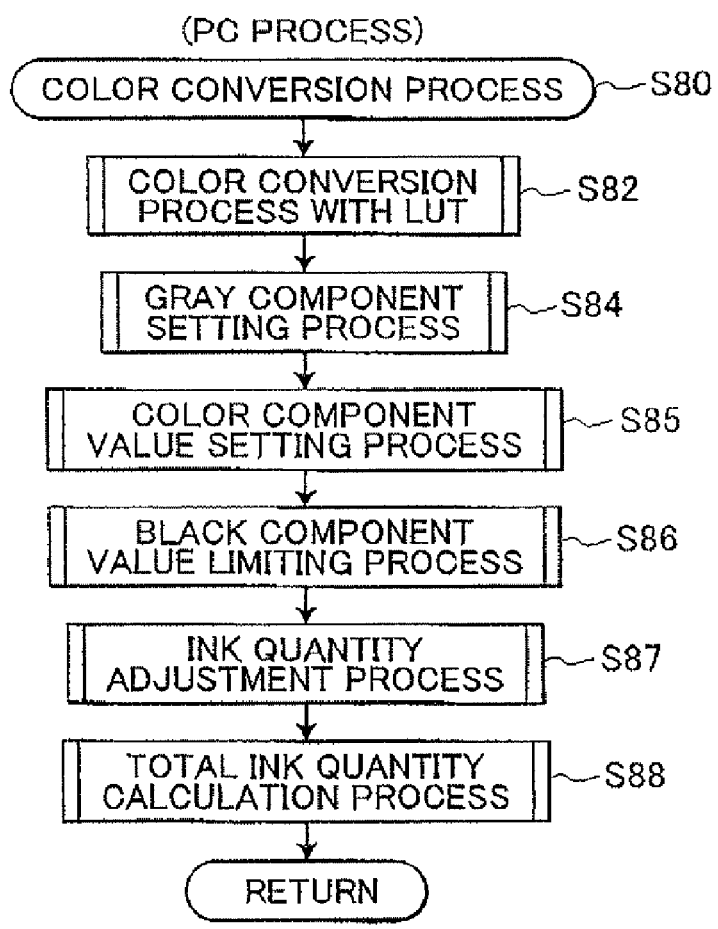
FIG. 16 is an explanatory diagram showing an example of a paper type table according to the fourth embodiment.
FIG. 17 is a flowchart illustrating steps in a color conversion process according to the fourth embodiment.

FIG. 16 is an explanatory diagram conceptually illustrating an example of the paper type table 152 in the fourth embodiment. As shown in FIG. 16, the paper type table 152 stores adjustment parameters $a_2$ and total ink quantities b in correlation with types of recording paper. A plurality of types of recording paper in the paper type table 152 is the same as that in the paper type table 144 of the first embodiment.

The paper type table 152 is created and stored on the HDD 14 when the printer driver 149 is installed. In the description of this embodiment, the plurality of types of recording paper envisioned by the printer vendor and adjustment parameters $a_2$ and total ink quantities b corresponding to these types of recording paper are stored in the paper type table 152 at this time. However, the printer driver 149 may be configured for allowing the user to add new types of recording paper and their corresponding adjustment parameters $a_1$ and total ink quantities b to the paper type table 152 as needed.

Next, the adjustment parameter $a_2$ according to the fourth embodiment will be described. The adjustment parameter $a_2$ functions to limit the black component value $K_2$ included in the second color data $C_2M_2Y_2K_2$ based on the type of recording paper. More specifically, the black component value $K_2$ is limited by reading the adjustment parameter $a_2$ associated with the user-selected recording paper from the paper type table 144 and multiplying the black component value $K_2$ by this adjustment parameter $a_2$. Equation (7) below shows an example calculation using the adjustment parameter $a_2$.

$$K_2 = a_2 * K_2 \tag{7}$$

Unlike in the first embodiment, the adjustment parameter $a_2$ is set to a higher value as the fixing property of black ink on the recording paper increases.

Therefore, higher adjustment parameters $a_2$ are associated with recording paper having a higher fixing property for K ink. For example, a "1" is stored as the adjustment parameter $a_2$ for the special paper, since the special paper has a high fixing property. In other words, the density of the K ink is not limited in this case, taking advantage of the properties of the special paper to produce high-quality images.

On the other hand, lower values of the adjustment parameter $a_2$ are assigned to recording paper having a lower ink-fixing property. For example, since the Paper 1 has a low ink-fixing property, "0" is stored as the adjustment parameter $a_2$. In this way, the density of K ink is greatly restricted for recording paper having a low K ink fixing property. Accordingly, the K ink is less likely to separate from the recording paper and, hence, less likely to soil other components in the image-forming device 40 or smear on the recording paper.

Next, the total ink quantity b will be described. The total ink quantity b has a correlation with the amount of ink that the recording paper can absorb.

For example, as shown in FIG. 16, the total ink quantity b is preset to a higher value for recording paper having high ink absorbency, such as the special paper. On the other hand, a low total ink quantity b is associated with recording paper having poor ink absorbency, such as the Paper 2. In this embodiment, ink overflow is suppressed by adjusting the chromatic component values $C_2$, $M_2$, and $Y_2$ based on the absorbency of the recording paper. This process will be described in detail below.

If the type of recording paper is not specified, the adjustment parameter $a_2$ and total ink quantity b associated with "Other" in the paper type table 152 is used.

In this embodiment, a page printing process similar to the page printing process of S1 in FIG. 6 is executed on the PC 10. The PC 10 according to the fourth embodiment executes a color conversion process of S80 shown in FIG. 17 in place of the color conversion process of S6 in the page printing process of S1 described with reference to FIG. 6. FIG. 17 is a flowchart illustrating steps in the color conversion process of S80 executed on the PC 10 according to the fourth embodiment.

In S82 of the color conversion process in FIG. 17, the PC 10 executes a color conversion process with the fourth LUT. In this process, the PC 10 converts RGB input values to first-order conversion data $C_1M_1Y_1$ based on the relationships stored in the fourth lookup table 150, and outputs the first-order conversion data $C_1M_1Y_1$.

In S84 the PC 10 executes a gray component setting process. In this process, the PC 10 determines the gray component value minK of RGB input values from the first-order conversion data $C_1M_1Y_1$ and outputs this gray component value minK.

In S85 the PC 10 executes a color component setting process for correcting the first-order conversion data $C_1M_1Y_1$ obtained in S82 with the correction values ($\Delta C$, $\Delta M$, $\Delta Y$) corresponding to the gray component value minK (see equations (1)-(3)) and sets color data $C_2M_2Y_2K_2$ corresponding to the RGB input values using the black component value K corresponding to gray component value minK.

In a black component value limiting process of S86, the PC 10 limits the black component value $K_2$ included in the color data $C_2M_2Y_2K_2$ with the adjustment parameter $a_2$ determined according to the type of recording paper to be used in image formation. In this way, the density of K ink ejected onto recording paper in the image-forming device 40 is limited to a suitable density for the type of recording paper. Accordingly, the K ink is less likely to separate from the recording paper and, hence, less likely to soil other members in the image-forming device 40 or smear on the recording paper.

As described above, since the color data $C_2M_2Y_2K_2$ is set based on the GCR table 151 in S65, the chromatic component values $C_2$, $M_2$, and $Y_2$ in the color data increase as the gray component value minK increases. Therefore, chromatic component values set for the input values of dark colors, i.e., colors with a high gray component value minK, are higher than chromatic component values set for input values of bright colors. As a result, it is less likely to occur that the phenomenon of color inversion in which dark colors with a large gray component are rendered lighter than bright colors with a small gray component, even when limiting the achromatic component value.

In S87 the PC 10 executes an ink quantity adjustment process for adjusting the chromatic component values $C_2$, $M_2$, and $Y_2$ set in S85 and the black component value $K_2$ limited in S86 based on an ink adjustment value determined for each color component. This ink quantity adjustment process serves, to adjust the coverage of ejected ink (dot gain).

If the values obtained in S87 by adjusting the chromatic component values $C_2$, $M_2$, and $Y_2$ are referred to as ink densities C', M', and Y' corresponding to the chromatic component values and the value obtained in S87 by adjusting the black component value $K_2$ is referred to as an ink density K' corresponding to the black component value, then the ink densities C', M', Y', and K' can be calculated according to equations (8) through (11) below while referring to a prescribed table (a monotonically increasing function; not shown).

$$C' = g_c(C_2) \tag{8}$$

$$M' = g_m(M_2) \tag{9}$$

$$Y' = g_y(Y_2) \tag{10}$$

$$K' = g_k(K_2) \tag{11}$$

In S88 the PC 10 executes a total ink quantity calculation process for reducing the ink densities C', M', and Y' for the chromatic components such that the sum of ink densities C', M', Y', and K' (sum=C'+M'+Y'+K') is no greater than the total ink quantity b corresponding to the type of recording paper used in image formation.

In the process of S88 the PC 10 first determines whether the sum is no greater than total ink quantity b. The PC 10 ends the color conversion process in S80 without reducing the ink densities C', M', and Y' if the sum is no greater than total ink quantity b. In this case, the CMYK output values are set to the ink densities C', M', Y', and K'.

However, if the sum is greater than total ink quantity b, then the PC 10 reduces the ink densities C', M', and Y' and sets the CMYK output values to the resulting ink densities C', M', Y', and K' according to equations (12)-(15) below.

$$C=C'*(b-K')/(SUM-K') \qquad (12)$$

$$M=M'*(b-K')/(SUM-K') \qquad (13)$$

$$Y=Y'*(b-K')/(SUM-K') \qquad (14)$$

$$K=K' \qquad (15)$$

In this way, the sum of color component values CMYK in the CMYK output values is no greater than the total ink quantity b, thereby avoiding ink overflow that can occur when the total ink quantity is greater than the quantity that the recording paper can absorb, which can lead to cockling or feathering. Further, this process preserves the density of K ink, thereby preserving the depth of dark colors. Further, since the proportions of CMY color component values are preserved with the above equations, these CMY component values can be reduced through simple calculations while accurately maintaining the original colors.

Further, since the ink densities C', M', and Y' for chromatic components are reduced such that the sum of the ink densities C', M', Y', and K' are no greater than the total ink quantity b after adjusting the chromatic component values $C_2$, $M_2$, and $Y_2$ and the achromatic component value $K_2$ based on the ink adjustment value, the ink density can be maintained at a high density up to the limit of total ink quantity b.

In the color conversion process of S80 according to the fourth embodiment, it is not necessary to prepare the GCR table 151 for each type of recording paper, thereby reducing the number of steps for creating the tables and the amount of memory usage compared to a process that stores GCR tables for each type of recording paper.

Next, a fifth embodiment of the present invention will be described. While in the fourth embodiment described above the chromatic component values $C_2$, $M_2$, and $Y_2$ and the black component value $K_2$ are set using the GCR table 151, in the fifth embodiment the chromatic component values $C_2$, $M_2$, and $Y_2$ are set without using the GCR table 151.

Figure 18A:
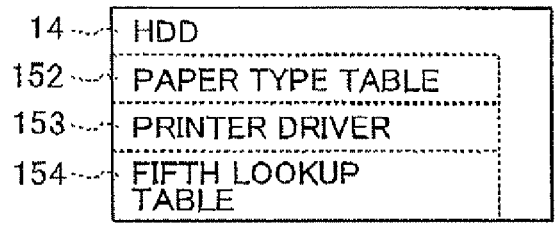
FIG. 18A is a block diagram conceptually illustrating the content of a hard disk drive on a personal computer according to a fifth embodiment.

FIG. 18A is a block diagram conceptually illustrating the HDD 14 of the PC 10 according to the fifth embodiment. The PC 10 and the image-forming device 40 according to the fifth embodiment differs from that of the first embodiment only in the configuration of the HDD 14. Since the remaining structure is identical to the PC 10 and the image-forming device 40 in the first embodiment, only the HDD 14 will be described below.

As shown in FIG. 18A, the HDD 14 according to the fifth embodiment stores the paper type table 152, a printer driver 153, and a fifth lookup table 154. Since the paper type table 152 is identical to that in the fourth embodiment described with reference to FIG. 16, a description and drawing for the paper type table 152 will not be repeated.

The printer driver 153 is a program implementing a page printing process that includes a color conversion process of S90 described later with reference to FIG. 19.

The fifth lookup table 154 is used for converting RGB input values to color data $C_2M_2Y_2K_2$ in the color conversion process of S90 according to the fifth embodiment. In the fourth embodiment described above, the color data $C_2M_2Y_2K_2$ referred to data converted using the GCR table 151. However, since the GCR table 151 is not used in the fifth embodiment, the color data $C_2M_2Y_2K_2$ will refer to data acquired by converting RGB input values using the fifth lookup table 154. Next, the fifth lookup table 154 will be described with reference to FIGS. 18B and 18C.

Figure 18B:
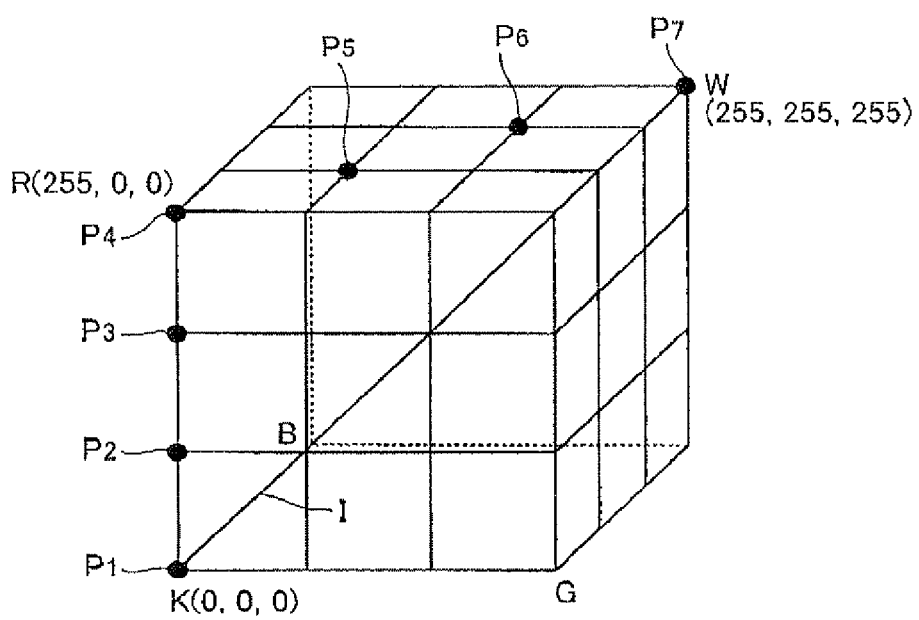
FIG. 18B is an explanatory diagram of an RGB cube having the five vertices red (R), green (G), blue (B), black (K), and white (W)

FIG. 18B shows an RGB cube having the five vertices red (R), green (G), blue (B), black (K), and white (W). In the example shown in FIG. 18B, the RGB color space has been divided into twenty-seven smaller cubes. The fifth lookup table 154 of the fifth embodiment stores CMYK values associated with RGB values at each vertex of the small cubes. Using these correlations, RGB input values can be converted to color data $C_2M_2Y_2K_2$ comprising CMYK component values.

A particular feature of the PC 10 according to the fifth embodiment is that the fifth lookup table 154 correlates CMYK values with each vertex of the small cubes so that the chromatic component values CMY increase as the gray component of the RGB input values increases. More specifically, the large cube shown in FIG. 18A has a straight line connecting black (K) with white (W) called an I-axis. If a vertical line is drawn from each vertex of the small cubes to the I-axis, the chromatic component values CMY corresponding to the vertex increase as the point on the I-axis intersected by the vertical line nears black (K).

Figure 18C:
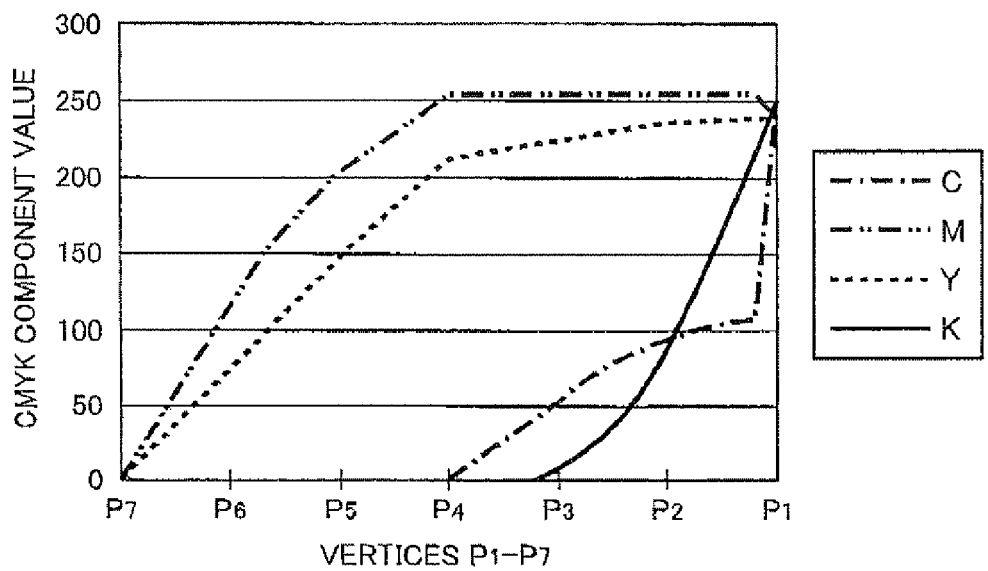
FIG. 18C is a graph showing correlations stored in a lookup table.

FIG. 18C is a graph illustrating the correlations stored in the fifth lookup table 154. The horizontal axis in the graph of FIG. 18C represents seven vertices $P_1$-$P_7$ extracted from the cube in FIG. 18B, while the vertical axis represents each of the CMYK component values correlated with these vertices $P_1$-$P_7$. As shown in FIG. 18C, the fifth lookup table 154 stores relationships predetermined so that the chromatic component values CMY increase as the gray component in the RGB input values increases, i.e., in order from $P_7$ to $P_1$.

Here, the "relationships predetermined so that chromatic component values CMY increase as the gray component in the RGB input values increases" signifies that correlations between RGB input values and chromatic component values CMY are set such that the sum of chromatic component values $C_2$, $M_2$, and $Y_2$ in the color data $C_2M_2Y_2K_2$ obtained through color conversion increases as the gray component of the RGB input values increases.

In other words, the relationships stored in the fifth lookup table 154 are not limited to relationships in which each of the cyan component value C, magenta component value M, and yellow component value Y increases when the gray component of the RGB input values increases. In the example of correlations stored in the fifth lookup table 154 plotted in FIG. 18C, the path of the magenta component value M (indicated by a broken line with alternating dashes and double dots in FIG. 18C) includes a portion with negative slope, but the amount of increase in the other color component values exceeds the amount of decrease in the magenta component value M. As a result, the sum of chromatic component values $C_2$, $M_2$, and $Y_2$ obtained through color conversion increases and the sum of the chromatic component values CMY increases. By allowing a slight drop in chromatic component values near the maximum value of K ink, the black is maintained, as shown in FIG. 18C.

The correlations stored in the fifth lookup table 154 are not limited in the example shown in FIG. 18C. For example, the fifth lookup table 154 may be configured so that the slope of trajectories depicted by each of the cyan component value C, magenta component value M, and yellow component value Y is always 0 or greater.

Figure 19:
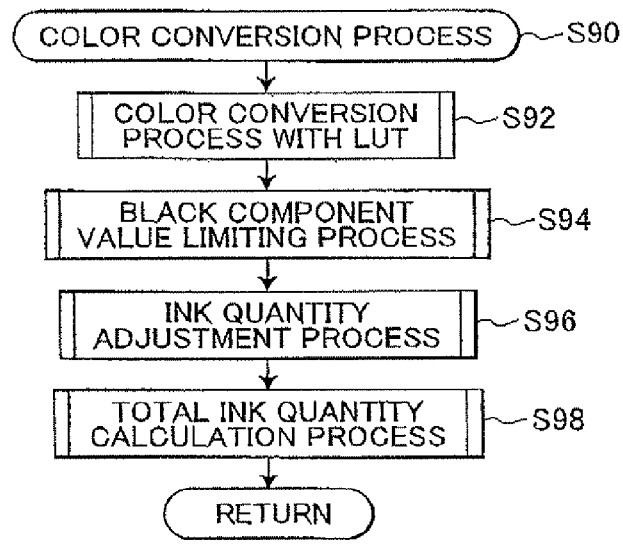
FIG. 19 is a flowchart illustrating steps in a color conversion process executed on the personal computer according to the fifth embodiment.

FIG. 19 is a flowchart illustrating steps in the color conversion process of S90 executed on the PC 10 according to the fifth embodiment. The PC 10 according to the fifth embodiment executes the color conversion process shown in FIG. 19 (S90) in place of the color conversion process (S6) in the page printing process (S1) described with reference to FIG. 6.

In S92 of the color conversion process shown in FIG. 19, the PC 10 sets color data $C_2M_2Y_2K_2$ corresponding to RGB input values based on the fifth lookup table 154 described with reference to FIG. 18C.

In S94 the PC 10 executes a black component value limiting process for limiting the black component value $K_2$ in the color data $C_2M_2Y_2K_2$ set in S92 according to an adjustment parameter $a_2$ set based on the type of recording paper to be used in the image-forming process. Accordingly, as described in the fourth embodiment, the density of K ink ejected onto the recording paper is restricted to an amount suited to the type of recording paper.

Since the color data $C_2M_2Y_2K_2$ is determined based on the fifth lookup table 154 described with reference to FIG. 18C in the process of S92, the chromatic component values $C_2$, $M_2$, and $Y_2$ included in the color data $C_2M_2Y_2K_2$ increase as the gray component in the RGB input values increases. Accordingly, as described in the fourth embodiment, color inversion in which dark colors with a large gray component appear lighter than light colors with a low gray component is less likely to occur.

In S96 the PC 10 executes an ink quantity adjustment process for adjusting the chromatic component values $C_2$, $M_2$, and $Y_2$ set in S92 and the black component value $K_2$ limited in S94 based on an ink adjustment value set according to each color component value.

In S98 the PC 10 executes a total ink quantity calculation process for determining output values by reducing the ink densities C', M', and Y' of the chromatic components such that the sum of ink densities C', H', and Y' corresponding to the chromatic component values and the ink density K' corresponding to the black component value produced from the ink quantity adjustment process in S96 (sum=C'+M'+Y'+K') is no greater than the total ink quantity b corresponding to the type of recording paper to be used in image formation. Since the ink quantity adjustment process of S96 is identical to the process of S87 and the total ink quantity calculation process of S98 is identical to the process of S88 described in FIG. 17, a detailed description of these processes will not be repeated.

In addition to the effects obtained by the color conversion process in S80 of the fourth embodiment, the color conversion process of S90 according to the fifth embodiment eliminates the need to prepare the fifth lookup table 154 for each type of recording paper. Accordingly, this process requires less steps for creating tables and less memory usage than when storing lookup tables for each type of recording paper.

While the invention has been described in detail with reference to specific embodiments thereof, it would be apparent to those skilled in the art that many modifications and variations may be made therein without departing from the spirit of the invention, the scope of which is defined by the attached claims.

For example, the color conversion process according to the first and second embodiments (S6, S610), the page printing process according to the third embodiment (S71), and the color conversion process according to the fourth and fifth embodiments (S80, S90) are executed by the PC 10, 100, or 200, but these processes may be executed by the image-forming device 40. More specifically, the PC 10, 100, or 200 in the first through fifth embodiments execute the process to convert color input data represented by RGB values to output color data represented by CMYK values. However, the image-forming device 40 may be configured to execute the color conversion processes described above (S6, S610, S80, S90) or the page printing process (S71) based on RGB input color data inputted from the PC 10, 100, or 200 or another external device.

Further, in the first and second embodiments described above, the each of the color component values $C_1$, $M_1$, $Y_1$, and $K_1$ in the first color data $C_1M_1Y_1K_1$, is multiplied by a common weight "$a_1$", and each color component value $C_2$, $M_2$, $Y_2$, and $K_2$ in the second color data $C_2M_2Y_2K_2$ is multiplied by a common weight "$(1-a_1)$". Accordingly, the CMYK output color data is obtained by adding the first color data $C_1M_1Y_1K_1$ and second color data $C_2M_2Y_2K_2$ while maintaining the balance of color component values in the first color data and the balance of color component values in the second color data. However, each color component value may be multiplied by a different weight, producing colors that take maximum advantage of the characteristics of the recording paper.

Further, after performing the color conversion process in the first through third embodiments (S6, S610, S71), it is possible to include additional processes, such as the ink quantity adjustment process described in the fourth and fifth embodiments (S87, S96).

Further, the first CMYK conversion process (S64) according to the first embodiment produces first color data $C_1M_1Y_1K_1$ by adding a black component value $K_1$ with a value of 0 to the first-order conversion data $C_1M_1Y_1$ acquired in the color conversion process with the first LUT (S62). However, rather than performing the first CMYK conversion process of S64, the first color data $C_1M_1Y_1$ may be set to the first-order conversion data $C_1M_1Y_1$ found in the color conversion process of S62.

Further, in the correction value acquisition process (S66) according to the first embodiment, correction values corresponding to the gray component value minK are acquired based on relationships stored in the GCR table 143 (see FIG. 3), but correction values may be acquired in another way. For example, it is possible to acquire correction values corresponding to the gray component value minK based on relationships stored in an under color removal (UCR) table. In this case, the second color data $C_2M_2Y_2K_2$ can be found from the following equations (16)-(19).

$$C_2 = C_1 - \text{UCR}(mink)c \qquad (16)$$

$$M_2 = M_1 - \text{UCR}(mink)m \qquad (17)$$

$$Y_2 = Y_1 - \text{UCR}(mink)y \qquad (18)$$

$$K_2 = minK - \text{UCR}(mink)k \qquad (19)$$

Here, UCR(minK)c is the C correction value corresponding to the gray component value minK; UCR(minK)m is the M correction value corresponding to the gray component value minK; UCR(minK)y is the Y correction value corresponding to the gray component value minK; and UCR(minK)k is the K correction value corresponding to the gray component value minK. Each of these values is acquired from a prestored UCR table.

The correction values ($\Delta C$, $\Delta M$, $\Delta Y$) stored in the GCR table 151 (see FIG. 15) in the fourth embodiment can be modified in various ways.

Figure 20:
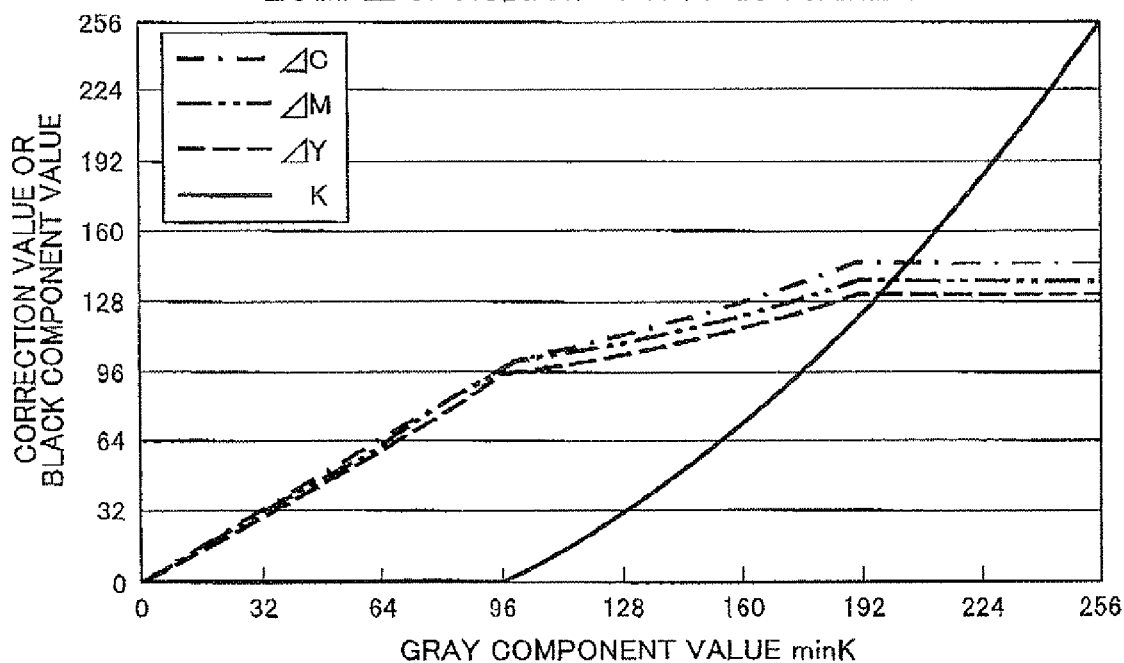
FIG. 20 is a graph showing correlations between gray component values minK and correction values stored in a GCR table according to a variation of the embodiments.

FIG. 20 is a graph showing correlations between the gray component value minK and correction values stored in a GCR table according to this variation. Values stored in the GCR table according to this variation are set such that the correction values (ΔC, ΔM, ΔY) increase as gray component value minK increases, but remain fixed upon arriving at a maximum value, despite a continued increase in gray component value minK. As a result, the chromatic component values $C_2$, $M_2$, and $Y_2$ obtained through correction remain constant after gray component value minK exceeds a prescribed value. The process using this GCR table obtains the same effects described in the fourth embodiment.

In other words, the "correction values established to produce larger chromatic component values through correction when the gray component of the input values is larger" are not limited to correction values having a constantly positive slope, as indicated by the trajectory of the correction values plotted in FIG. 15. For example, if the paths of correction values (ΔC, ΔM, ΔY) stored in the GCR table is drawn for each color on a Cartesian plane in which the horizontal axis represents gray component value minK and the vertical axis the correction values, the paths of correction values may include a section having a slope of "0" as shown in FIG. 20.

Further, "correction values established to produce larger chromatic component values through correction" are not limited to correction values established such that each component value for a plurality of colors grows larger when the output values include chromatic component values for a plurality of colors. The correction values may be established such that the sum of chromatic component values for the plurality of colors grows larger as the gray component increases.

Further, in the color conversion process of S80 according to the fourth embodiment, correction is performed based on relationships stored in the GCR table 151 (see FIG. 15). However, the present invention may be applied to a process in which a UCR table is used in place of the GCR table, for example.

Further, the first through fifth embodiments describe the adjustment parameter $a_1$, adjustment parameter $a_2$, or total ink quantity b as being set based on a type of recording paper inputted by the user. However, the type of recording paper may also be identified by reading a radio-frequency identification (RFID) tag or barcode applied to the recording paper, and the adjustment parameter $a_1$, adjustment parameter $a_2$, or total ink quantity b may be set based on the type of recording paper identified in this way.

It is also possible to allow the user to classify recording paper subjectively and to input data indicating these classifications as types of recording paper. For example, the user could be prompted to input values such as "good," "fair," or "poor" for the ink-fixing property and ink absorbency of recording paper, and the image-forming device may use the adjustment parameter $a_1$, adjustment parameter $a_2$, or total ink quantity b prestored in association with each inputted type. Accordingly, the adjustment parameter $a_1$, adjustment parameter $a_2$, or total ink quantity b are set to appropriately values adapted to the user's subjectivity.

Further, in the total ink quantity calculation process (S88, S98) according to the fourth and fifth embodiments described above, color component values are reduced while maintaining the CMY balance. However, it is also possible to reduce color component values at a different ratio for each color.

Further, in the first through fifth embodiments described above, RGB input values are converted to output values including the four colors cyan, magenta, yellow, and black. However, the present invention may also be applied to a device that converts input values to five or more color component values when the image-forming device can form images using five or more colors, such as light cyan and light magenta (chromatic inks) and light black (achromatic ink) in addition to the above colors.

What is claimed is:

1. A color conversion device for converting an input value to an output value in order to form an image on a recording medium using an achromatic ink and a chromatic ink, the color conversion device comprising:
    a first color converting unit that converts the input value to first color data including a first chromatic component value and a first achromatic component value;
    a second color converting unit that converts the input value to second color data including a second chromatic component value and a second achromatic component value;
    an adjustment value setting unit that sets an adjustment value based on a type of the recording medium; and
    an output value acquiring unit that acquires the output value by weighting the first color data and the second color data according to the adjustment value,
    wherein the second achromatic component value of the second color data is equal to or greater than the first achromatic component value of the first color data.

2. The color conversion device according to claim 1, further comprising:
    a gray component value setting unit that sets a gray component value based on the first chromatic component value; and
    a first relationship storing unit that stores a first relationship between the gray component value and a combination of a first correction value for the first chromatic component value and a second correction value for the second achromatic component value, and
    wherein the second color converting unit converts the input value to the second color data by correcting the first chromatic component value using the first correction value and the second correction value corresponding to the gray component value according to the first relationship.

3. The color conversion device according to claim 2, further comprising a second relationship storing unit that stores a second relationship between the input value and the first chromatic component value, and
    wherein the first color converting unit comprises a chromatic component converting unit that converts the input value to the first chromatic component value of the first color data based on the second relationship.

4. The color conversion device according to claim 3, wherein the first color converting unit further comprises a first color data generating unit that generates the first color data by attaching the first achromatic component value to the first chromatic component value acquired by the chromatic component converting unit.

5. The color conversion device according to claim 1, further comprising:
    a third relationship storing unit that stores a third relationship between a third achromatic component value and a third chromatic component value corresponding to the input value; and
    a fourth relationship storing unit that stores a fourth relationship between a fourth achromatic component value and a fourth chromatic component value relative to the input value such that the fourth achromatic component value is equal to or greater than the third achromatic component value, and wherein the first color converting unit converts the input value to the first color data based on the third relationship, and wherein the second color converting unit converts the input value to the second color data based on the fourth relationship.

6. The color conversion device according to claim 1, wherein the achromatic ink is a pigment ink.

7. A color conversion device for converting an input value to an output value in order to form an image on a recording medium using an achromatic ink and a chromatic ink, the color conversion device comprising:
 a first relationship storing unit that stores a first relationship between the input value and a combination of a first achromatic component value and a first chromatic component value; and
 a second relationship storing unit that stores a second relationship between the input value and a combination of a second achromatic component value and a second chromatic component value such that the second achromatic component value is equal to or greater than the first achromatic component value;
 an adjustment value setting unit that sets an adjustment value based on a type of the recording medium;
 a relationship creating unit that creates a third relationship between the input value and a combination of a third achromatic component value and a third chromatic component value by weighting the first achromatic and chromatic component values and the second achromatic and chromatic component values based on the adjustment value; and
 an output value acquiring unit that acquires the output value, according to the third chromatic component value and the third achromatic component value, by converting the input value based on the third relationship.

8. The color conversion device according to claim 7, wherein the achromatic ink is a pigment ink.

9. A color conversion device for converting an input value to an output value in order to form an image on a recording medium using an achromatic ink and a chromatic ink, the color conversion device comprising:
 a determining unit that determines a first chromatic component value and a first achromatic component value from the input value based on a predetermined relationship, the predetermined relationship defining that the first chromatic component value increases as a gray component of the input value increases;
 a limiting value setting unit that sets a limiting value based on a type of the recording medium;
 a limiting unit that limits the first achromatic component value by the limiting value; and
 an output value setting unit that sets the output value based the first chromatic component value and a limited first achromatic component value.

10. The color conversion device according to claim 9, further comprising:
 a first lookup table storing unit that stores a first lookup table defining a relationship of the input value to a second chromatic component value;
 a color converting unit that converts the input value to the second chromatic component value by referring the first lookup table;
 a gray component value setting unit that sets a gray component value equivalent to the gray component of the input value based on the second chromatic component value; and
 a correction value storing unit that stores a first relationship, as the predetermined relationship, between the gray component value and a correction value for the second chromatic component value,
 wherein the determining unit determines the first chromatic component value by correcting the second chromatic component value using the correction value, and
 wherein the correction value is defined to produce to increase the first chromatic component value through correction when the gray component of the input value increases.

11. The color conversion device according to claim 9, further comprising a second lookup table storing unit that stores a second lookup table as the predetermined relationship, and
 wherein the determining unit determines the first chromatic component value and the first achromatic component value based on the second lookup table.

12. The color conversion device according to claim 9, further comprising:
 an ink amount setting unit that sets an ink amount limit according to the type of the recording medium; and
 an ink amount limiting unit that reduces a first ink density corresponding to the first chromatic component value so that a total ink density corresponding to the first chromatic component value and the limited first achromatic component value is less than the ink amount limit.

13. The color conversion device according to claim 12, further comprising:
 an ink adjustment value setting unit that sets ink adjustment values for the first chromatic component value and the limited first achromatic component value based on the type of the recording medium; and
 an adjusting unit that adjusts the first chromatic component value and the limited first achromatic component value based on the ink adjustment values, respectively;
 wherein the ink amount limiting unit reduces the first ink density corresponding to the first chromatic component value adjusted by the adjusting unit so that the total ink density is less than the ink amount limit, the total ink density corresponding to the first chromatic component value adjusted by the adjusting unit and to the limited first achromatic component value adjusted by the adjusting unit.

14. A non-transitory computer-readable storage medium storing a computer-executable color conversion program for a color conversion device, the color conversion device converting an input value to an output value in order to form an image on a recording medium using an achromatic ink and a chromatic ink, the color conversion program comprising:
 instructions for converting the input value to first color data including a first chromatic component value and a first achromatic component value;
 instructions for converting the input value to second color data including a second chromatic component value and a second achromatic component value;
 instructions for setting an adjustment value based on a type of the recording medium; and
 instructions for acquiring the output value by weighting the first color data and the second color data according to the adjustment value,
 wherein the second achromatic component value of the second color data is equal to or greater than the first achromatic component value of the first color data.

15. A non-transitory computer-readable storage medium storing a computer-executable color conversion program for a color conversion device, the color conversion device converting an input value to an output value in order to form an image on a recording medium using an achromatic ink and a chromatic ink, the color conversion device comprising a first relationship storing unit that stores a first relationship between the input value and a combination of a first achromatic component value and a first chromatic component value; and a second relationship storing unit that stores a second relationship between the input value and a combination of a second achromatic component value and a second chromatic component value such that the second achromatic component value is equal to or greater than the first achromatic component value, the color conversion program comprising:

instructions for setting an adjustment value based on a type of the recording medium;

instructions for creating a third relationship between the input value and a combination of a third achromatic component value and a third chromatic component value by weighting the first achromatic and chromatic component values and the second achromatic and chromatic component values based on the adjustment value; and instructions for acquiring the output value, according to the third chromatic component value and the third achromatic component value, by converting the input value based on the third relationship.

16. A non-transitory computer-readable storage medium storing a computer-executable color conversion program for a color conversion device, the color conversion device converting an input value to an output value in order to form an image on a recording medium using an achromatic ink and a chromatic ink, the color conversion program comprising:

instructions for determining a chromatic component value and a achromatic component value from the input value based on a predetermined relationship, the predetermined relationship defining that the chromatic component value increases as a gray component of the input value increases;

instructions for setting a limiting value based on a type of the recording medium;

instructions for limiting the achromatic component value by the limiting value; and instructions for setting the output value based the chromatic component value and a limited achromatic component value.

17. A color conversion method for converting an input value to an output value in order to form an image on a recording medium using an achromatic ink and a chromatic ink, the color conversion method comprising:

converting the input value to first color data including a first chromatic component value and a first achromatic component value;

converting the input value to second color data including a second chromatic component value and a second achromatic component value;

setting an adjustment value based on a type of the recording medium; and acquiring the output value by weighting the first color data and the second color data according to the adjustment value, wherein the second achromatic component value of the second color data is equal to or greater than the first achromatic component value of the first color data.

18. A color conversion method for a color conversion device, the color conversion device converting an input value to an output value in order to form an image on a recording medium using an achromatic ink and a chromatic ink, the color conversion device comprising a first relationship storing unit that stores a first relationship between the input value and a combination of a first achromatic component value and a first chromatic component value; and a second relationship storing unit that stores a second relationship between the input value and a combination of a second achromatic component value and a second chromatic component value such that the second achromatic component value is equal to or greater than the first achromatic component value, the color conversion program comprising:

setting an adjustment value based on a type of the recording medium;

creating a third relationship between the input value and a combination of a third achromatic component value and a third chromatic component value by weighting the first achromatic and chromatic component values and the second achromatic and chromatic component values based on the adjustment value; and acquiring the output value, according to the third chromatic component value and the third achromatic component value, by converting the input value based on the third relationship.

19. A color conversion method for converting an input value to an output value in order to form an image on a recording medium using an achromatic ink and a chromatic ink, the color conversion program comprising:

determining a chromatic component value and a achromatic component value from the input value based on a predetermined relationship, the predetermined relationship defining that the chromatic component value increases as a gray component of the input value increases;

setting a limiting value based on a type of the recording medium;

limiting the achromatic component value by the limiting value; and setting the output value based the chromatic component value and a limited achromatic component value.

* * * * *